US011562598B2

(12) United States Patent
Sawhney et al.

(10) Patent No.: US 11,562,598 B2
(45) Date of Patent: Jan. 24, 2023

(54) SPATIALLY CONSISTENT REPRESENTATION OF HAND MOTION

(71) Applicant: Microsoft Technology Licensing, LLC, Redmond, WA (US)

(72) Inventors: Harpreet Singh Sawhney, Kirkland, WA (US); Ning Xu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/529,632

(22) Filed: Aug. 1, 2019

(65) Prior Publication Data

US 2020/0311397 A1    Oct. 1, 2020

Related U.S. Application Data

(63) Continuation-in-part of application No. 16/363,964, filed on Mar. 25, 2019.

(51) Int. Cl.
*G06V 40/20*    (2022.01)
*G02B 27/01*    (2006.01)
(Continued)

(52) U.S. Cl.
CPC ........... *G06V 40/28* (2022.01); *G02B 27/017* (2013.01); *G06V 10/40* (2022.01); *G06V 40/107* (2022.01)

(58) Field of Classification Search
CPC ....... G02B 27/017; G06F 3/011; G06F 3/017; G06F 3/0304; G06F 3/04815;
(Continued)

(56) References Cited

U.S. PATENT DOCUMENTS 10,402,081 B1 * 9/2019 Andersen ................ G06F 3/017
2011/0298824 A1   12/2011 Lee et al.
(Continued)

FOREIGN PATENT DOCUMENTS

EP    3358448 A1    8/2018
WO   2018222756 A1  12/2018

OTHER PUBLICATIONS

"BMW Augmented Reality", Retrieved from: https://www.youtube.com/watch?v=P9KPJ1A5yds, Oct. 3, 2007, 1 Page.
(Continued)

*Primary Examiner* — Kenneth Bukowski
(74) *Attorney, Agent, or Firm* — Alleman Hall Creasman & Tuttle LLP

(57) ABSTRACT

Examples are disclosed that relate to representing recorded hand motion. One example provides a computing device comprising a logic subsystem and a storage subsystem comprising instructions executable by the logic subsystem to receive a recorded representation of hand motion determined relative to a virtual model aligned to a first instance of an object, receive image data corresponding to an environment, and recognize a second instance of the object in the environment. The instructions are further executable to align the virtual model to the second instance of the object, and output a parametric representation of hand motion for display relative to the virtual model as aligned to the second instance of the object, such that the parametric representation is spatially consistent with the recorded representation of hand motion relative to the virtual model as aligned to the first instance of the object.

20 Claims, 29 Drawing Sheets

(51) Int. Cl.
*G06V 10/40* (2022.01)
*G06V 40/10* (2022.01)

(58) Field of Classification Search
CPC .. G06K 9/00355; G06K 9/00375; G06K 9/46; G09B 5/02
See application file for complete search history.

(56) References Cited

U.S. PATENT DOCUMENTS

| | | | |
|---|---|---|---|
| 2014/0045593 A1* | 2/2014 | Giusti | A63F 13/10 463/32 |
| 2014/0132498 A1* | 5/2014 | Miller | G06F 3/0304 345/156 |
| 2014/0176603 A1 | 6/2014 | Kumar et al. | |
| 2014/0282105 A1* | 9/2014 | Nordstrom | G09B 19/003 715/753 |
| 2014/0347479 A1 | 11/2014 | Givon | |
| 2015/0091780 A1 | 4/2015 | Lyren | |
| 2015/0234454 A1* | 8/2015 | Kurz | G06F 3/011 345/156 |
| 2015/0235441 A1 | 8/2015 | Abovitz et al. | |
| 2016/0180743 A1 | 6/2016 | Ahmad | |
| 2016/0292925 A1 | 10/2016 | Montgomerie et al. | |
| 2017/0237789 A1 | 8/2017 | Harner et al. | |
| 2018/0182160 A1 | 6/2018 | Boulton et al. | |
| 2019/0139320 A1* | 5/2019 | Davies | G06F 3/02 |
| 2019/0384406 A1 | 12/2019 | Smith et al. | |
| 2020/0193614 A1* | 6/2020 | Tadi | G06T 7/251 |

OTHER PUBLICATIONS

"Remote Maintenance Assistance", Retrieved from: http://www.youtube.com/watch?v= vnqNrKIjLg, Apr. 6, 2016, 3 Pages.

"Application as Filed in U.S. Appl. No. 16/017,893", filed Jun. 25, 2018, 49 Pages.

Chi, et al., "DemoCut: Generating Concise Instructional Videos for Physical Demonstrations", In Proceedings of the 26th Annual ACM symposium on User Interface Software and Technology, Octo. 8, 2013, pp. 141-150.

Gupta, et al., "DuploTrack: A Real-time System for Authoring and Guiding Duplo Block Assembly", In Proceedings of the 25th Annual ACM Symposium on User Interface Software and Technology, Oct. 7, 2012, pp. 389-401.

Held, et al., "3D Puppetry: A Kinect-based Interface for 3D Animation", In Proceedings of the 25th Annual ACM Symposium on User Interface Software and Technology, Oct. 7, 2012, pp. 423-434.

Lamberti, et al., "Challenges, Opportunities, and Future Trends of Emerging Techniques for Augmented Reality-Based Maintenance", In Journal of IEEE Transactions on Emerging Topics in Computing, vol. 2, Issue 4, Dec. 2014, pp. 411-421.

Mohr, et al., "Retargeting Video Tutorials Showing Tools With Surface Contact to Augmented Reality", In Proceedings of the CHI Conference on Human Factors in Computing Systems, May 6, 2017, pp. 6547-6558.

"International Search Report and Written Opinion Issued in PCT Application No. PCT/US20/015342", dated May 4, 2020, 38 Pages.

"International Search Report and Written Opinion Issued in PCT Application No. PCT/US20/015357", dated Apr. 24, 2020, 34 Pages.

Stauffer, et al., "Adaptive background mixture models for real-time tracking", In Proceedings of the Computer Society Conference on Computer Vision and Pattern Recognition, Jun. 23, 1999, pp. 246-252.

Tekin, et al., "Real-Time Seamless Single Shot 6D Object Pose Prediction", In Proceedings of the IEEE Conference on Computer Vision and Pattern Recognition, Jun. 18, 2018, pp. 292-301.

"Final Office Action Issued in U.S. Appl. No. 16/363,964", dated Jul. 20, 2021, 22 Pages.

"Non Final Office Action Issued in U.S. Appl. No. 16/363,964", dated Dec. 7, 2020, 18 Pages.

"Final Office Action Issued in U.S. Appl. No. 16/363,964", dated Mar. 1, 2022, 13 Pages.

U.S. Appl. No. 16/363,964, filed Mar. 25, 2019.

"Non Final Office Action Issued in U.S. Appl. No. 16/363,964", dated Nov. 17, 2021, 22 Pages.

"Non Final Office Action Issued in U.S. Appl. No. 16/363,964", dated Jun. 17, 2022, 16 Pages.

Oct. 1, 2020, US-2020-0311396-A1.

"Final Office Action Issued in U.S. Appl. No. 16/363,964", dated Sep. 30, 2022, 18 Pages.

\* cited by examiner

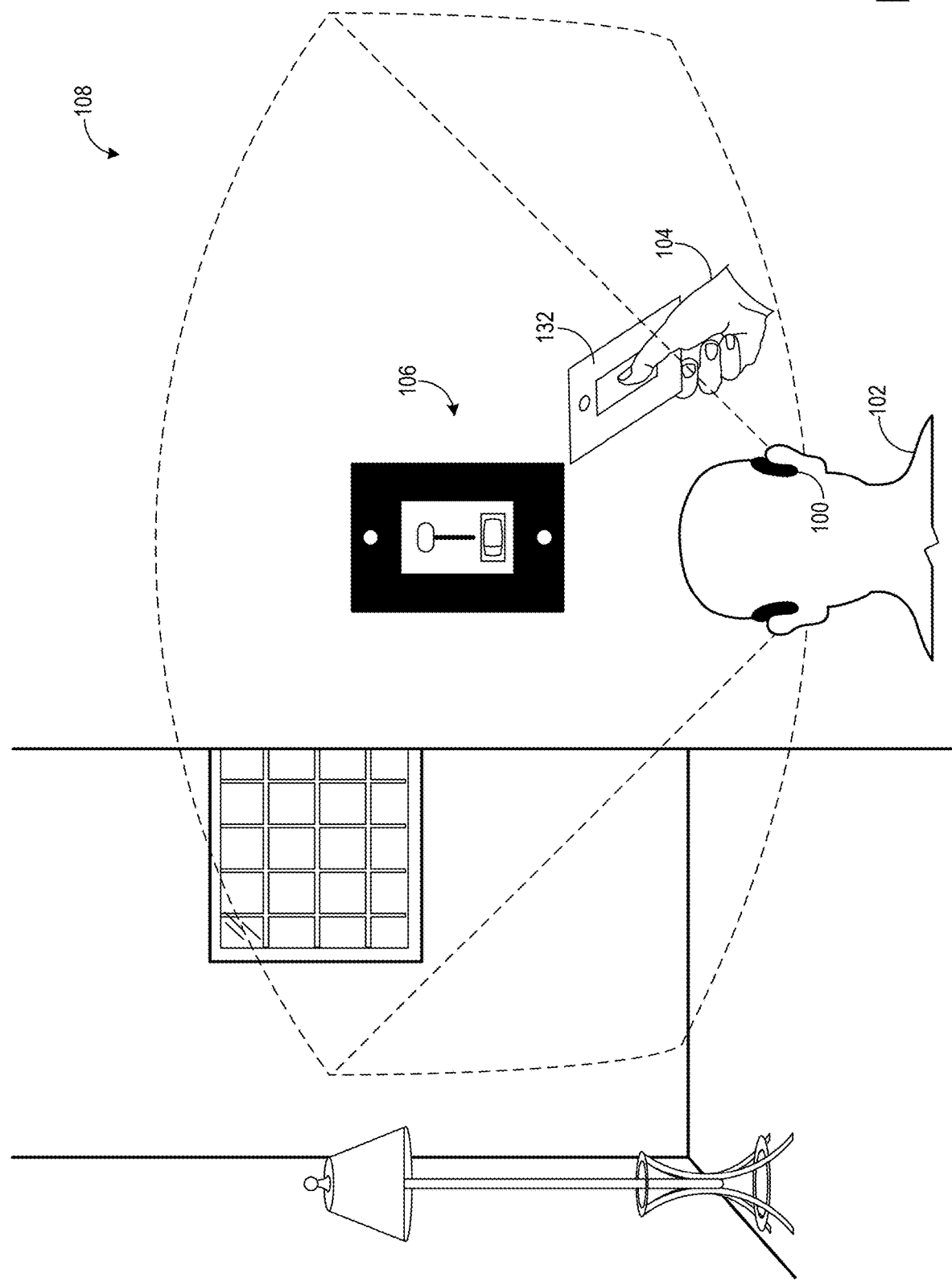

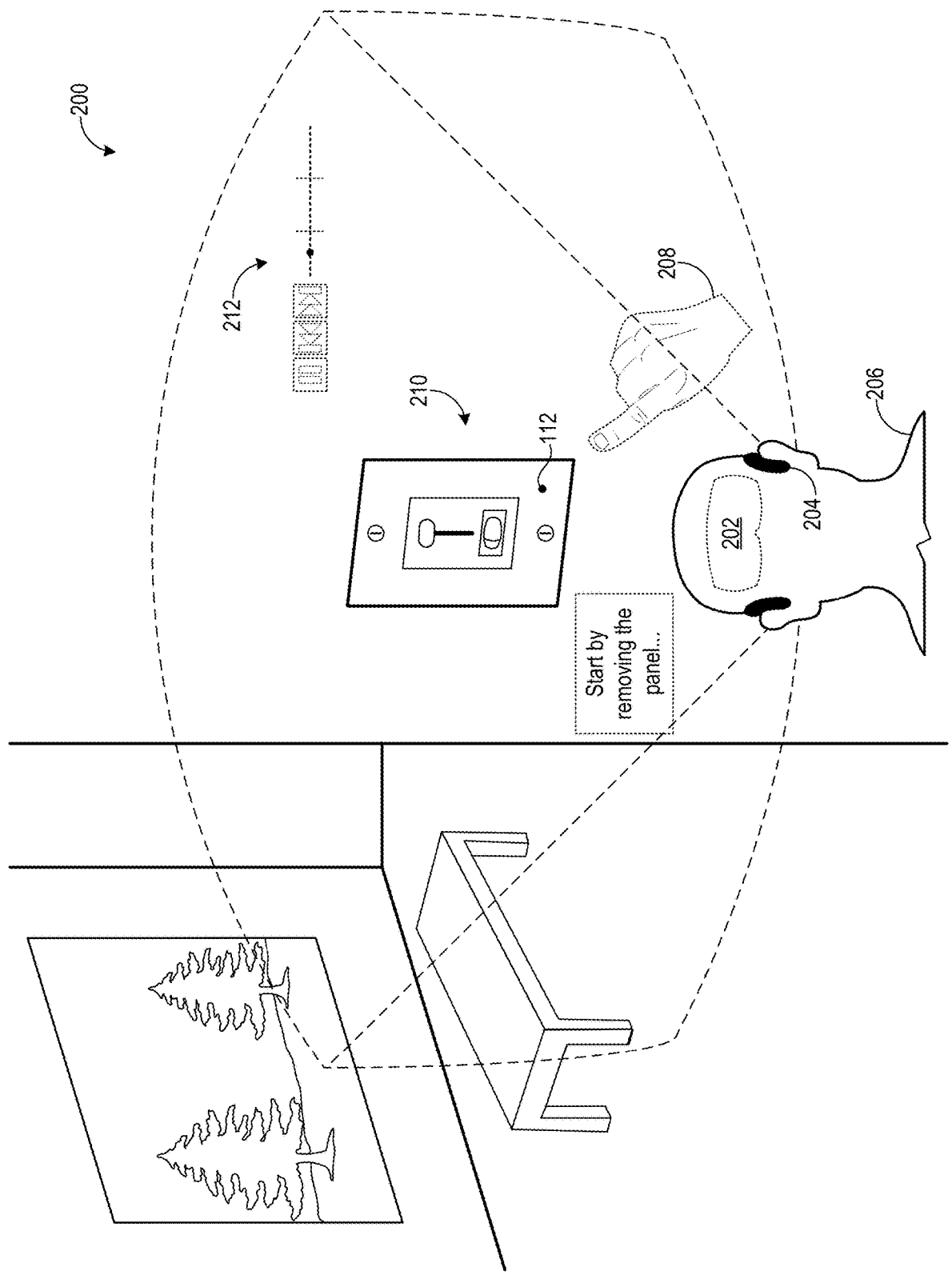

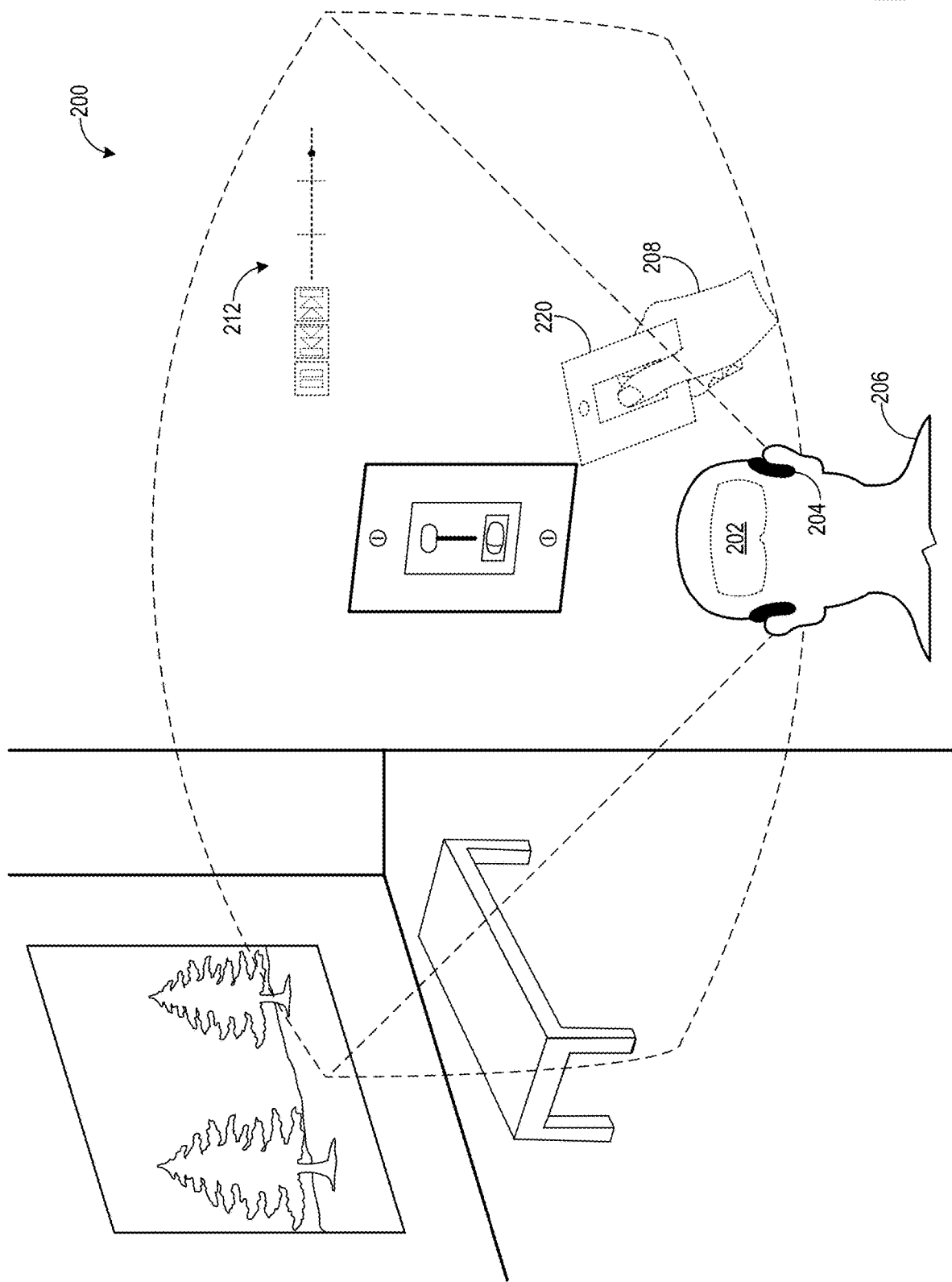

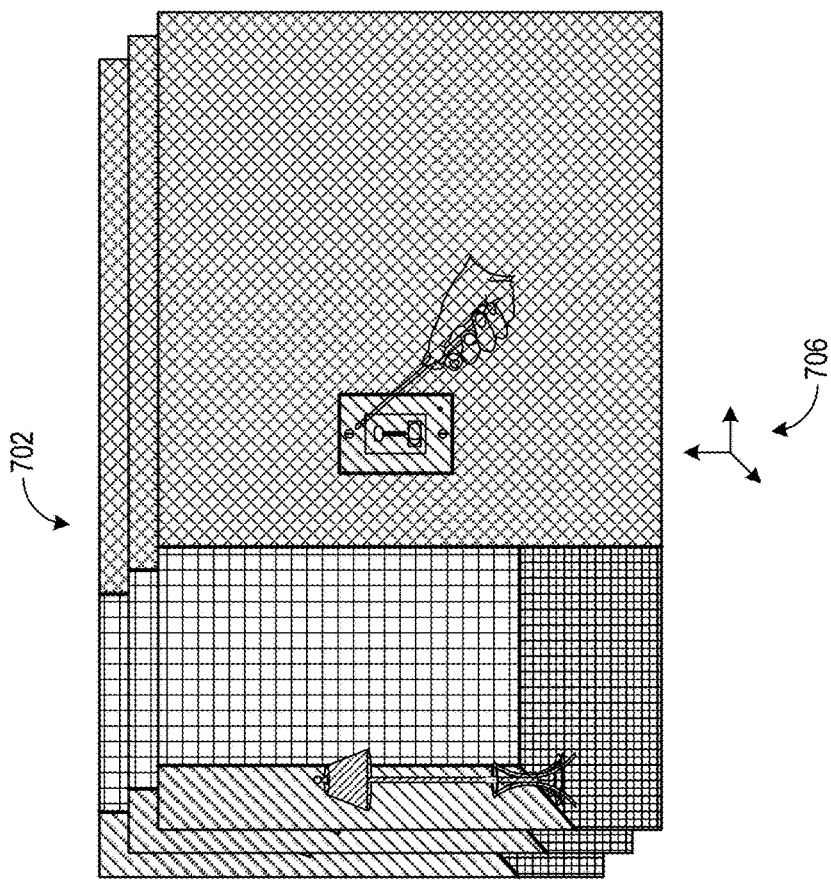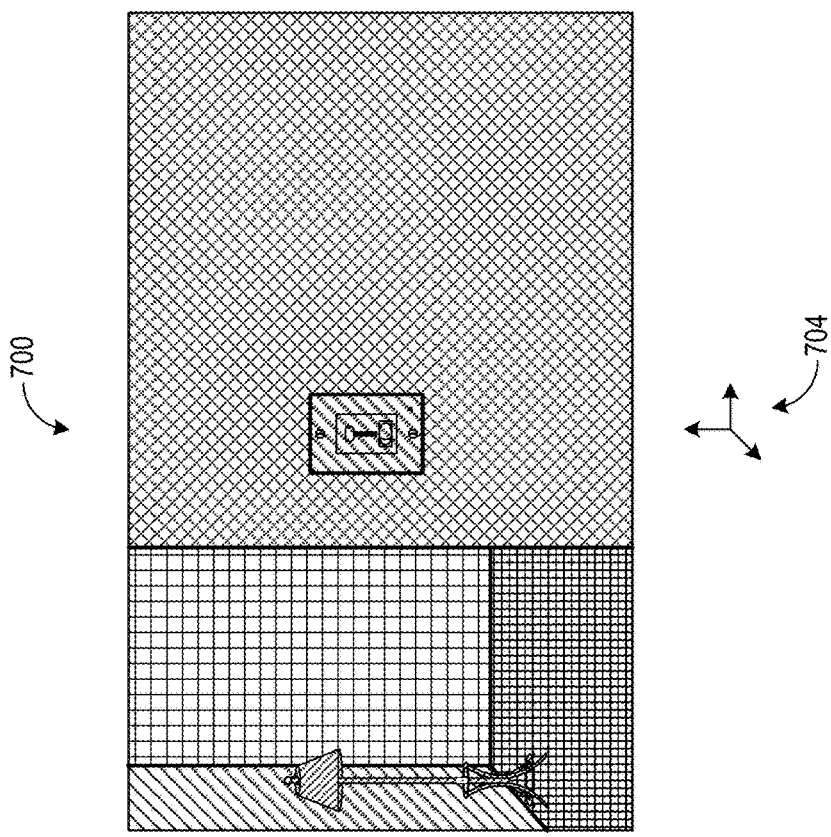
FIG. 7

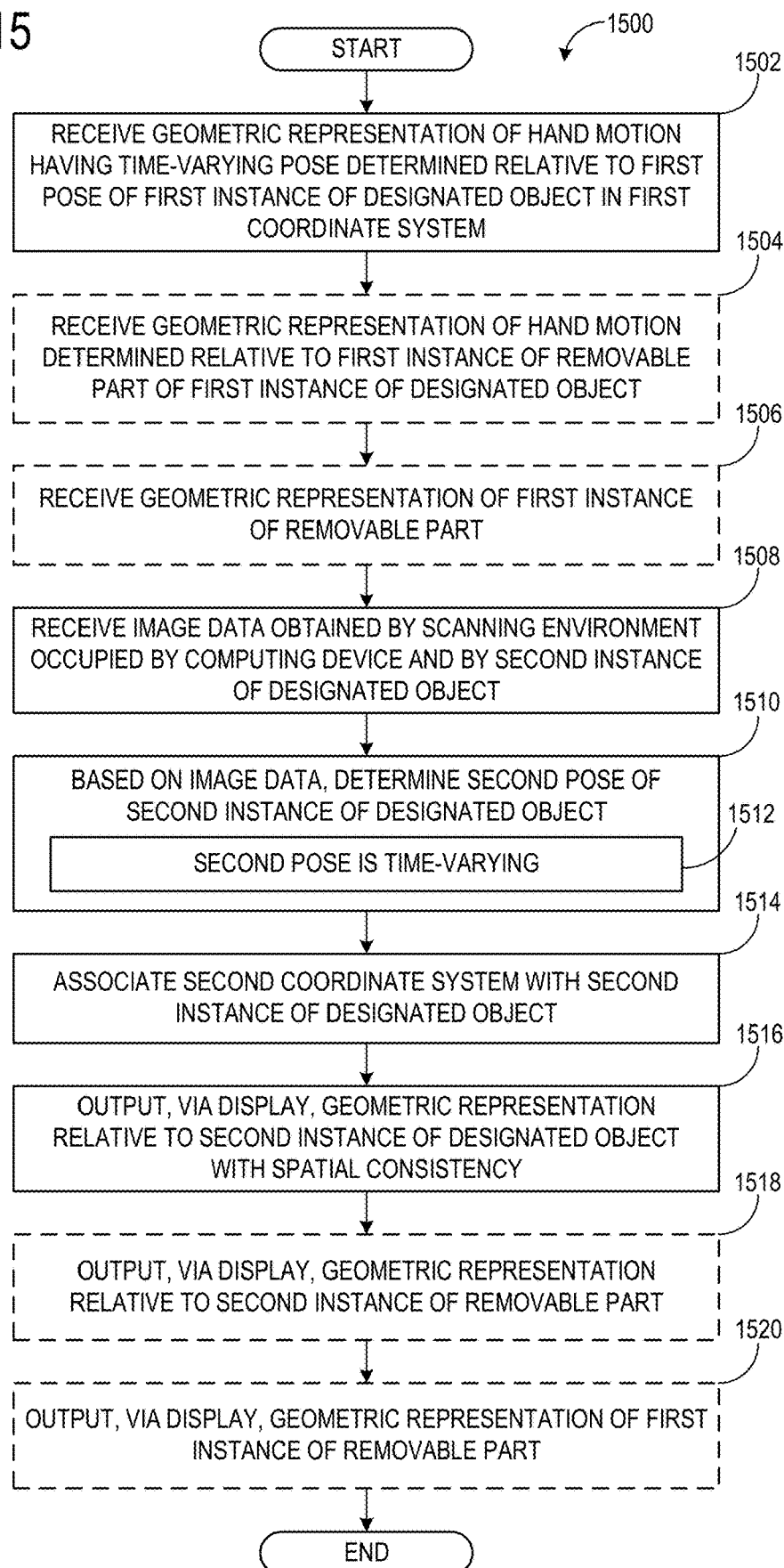

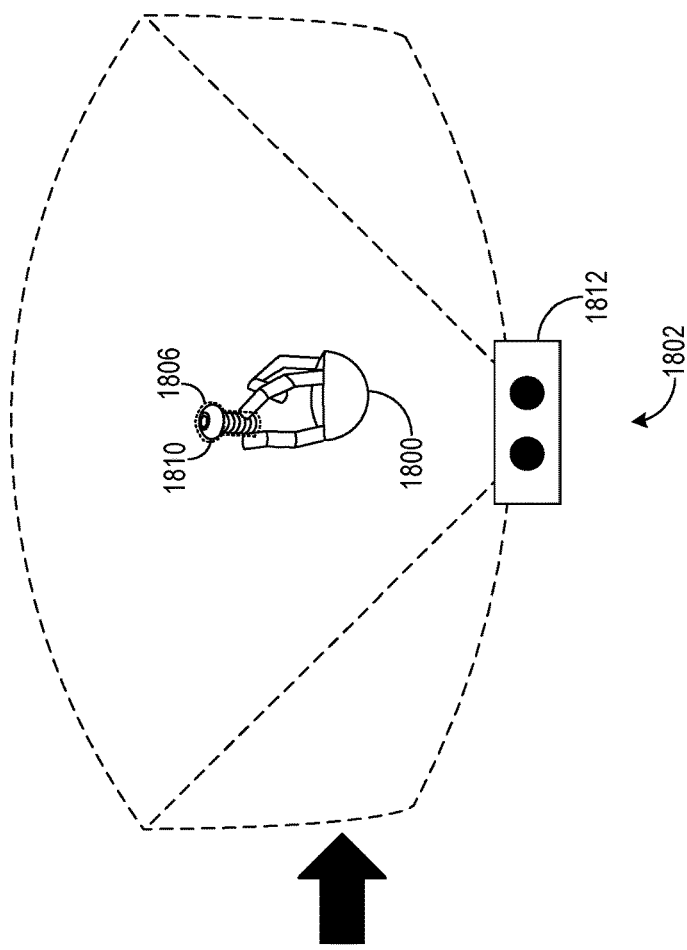
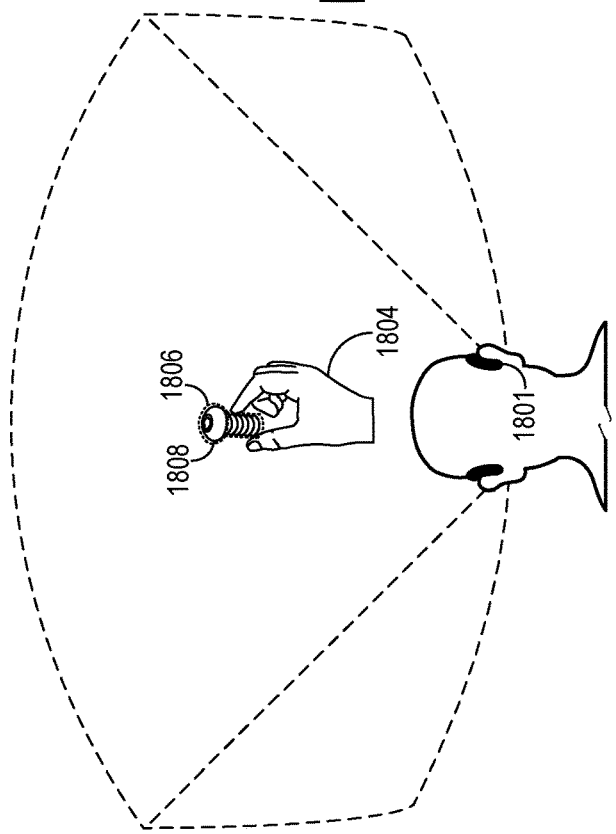
FIG. 18

SPATIALLY CONSISTENT REPRESENTATION OF HAND MOTION

CROSS REFERENCE TO RELATED APPLICATIONS

This application is a continuation-in-part of U.S. application Ser. No. 16/363,964, filed Mar. 25, 2019, the entirety of which is hereby incorporated herein by reference for all purposes.

BACKGROUND

In video tutorials, instructors may teach viewers how to perform a particular task by performing the task themselves. For a hands-on task, a video tutorial may demonstrate hand motion performed by an instructor. Viewers may thus learn the hands-on task by mimicking the hand motion and other actions shown in the video tutorial. In other scenarios, a robotic device may learn to perform a task by observing the performance of the task in video.

BRIEF DESCRIPTION OF THE DRAWINGS

FIGS. 1A-1C illustrate the recording of hand motion.

FIGS. 2A-2C illustrate playback of a representation of recorded hand motion.

FIG. 7 shows example static and time-varying representations of an environment.

FIG. 15 shows a flowchart illustrating a method of outputting a geometric representation of hand motion.

FIG. 18 illustrates an example in which a manipulator of a robotic device is controlled according to a parametric representation of hand motion.

DETAILED DESCRIPTION

Figure 1A:
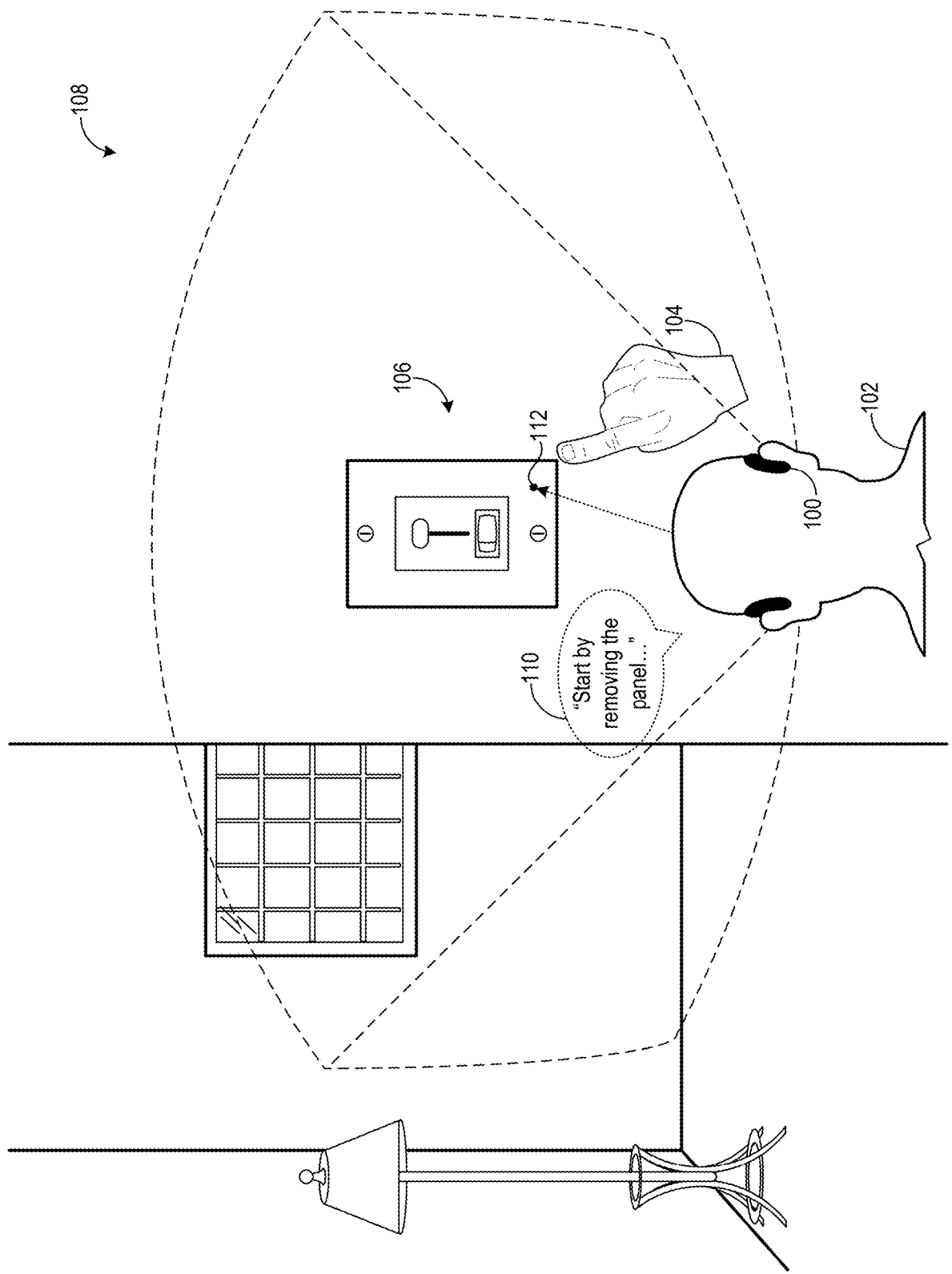

In video tutorials, instructors may teach viewers how to perform a particular task by performing the task themselves. For hands-on tasks, a video tutorial may demonstrate hand motion performed by an instructor. Viewers may thus learn the hands-on task by mimicking the hand motion and other actions shown in the video tutorial.

Recording a video tutorial may prove cumbersome, however. For example, the presence of another person in addition to an instructor demonstrating a task may be required to record the demonstration. Where instructors instead record video tutorials themselves, an instructor may alternate between demonstrating a task and operating recording equipment. Frequent cuts and/or adjustments to the recorded scene may increase the difficulty and length of the recording process.

Video tutorials may pose drawbacks for viewers as well. Where a video tutorial demonstrates actions performed with respect to an object—as in repairing equipment, for example—viewers may continually alternate between watching the tutorial on a display (e.g., of a phone or tablet) and looking at the object and their hands to mimic those actions. Complex or fine hand motion may render its imitation even more difficult, causing viewers to frequently alternate their gaze and pause video playback. In some examples, viewers may be unable to accurately mimic hand motion due to its complexity and/or the angle from which it was recorded.

As such, alternative solutions for recording and demonstrating hand motion have been developed. In some alternatives, hand motion is represented by animating a virtual three-dimensional model of a hand using computer graphics rendering techniques. While this may enable hand motion to be perceived in ways a real hand recorded in video cannot, modeling the motion of human hands can be highly challenging and time-consuming, requiring significant effort and skill. Further, where a real hand represented by a virtual model holds a real object, the virtual model may be displayed without any representation of the object. Other approaches record hand motion via wearable input devices (e.g., a glove) that sense kinematic motion or include markers that are optically imaged to track motion. Such devices may be prohibitively expensive, difficult to operate, and/or unsuitable for some environments, however.

Accordingly, examples are disclosed that relate to representing hand motion in a manner that may streamline both its recording and viewing. As described below, a user may employ a head-mounted display (HMD) device to optically record hand motion simply by directing their attention toward their hands. As such, the user's hands may remain free to perform hand motion without requiring external recording equipment, body suits/gloves, or the presence of another person. Via the HMD device or another device, the recorded hand motion may be separated from irrelevant parts of the background environment recorded by the HMD device. A graphical representation (e.g., virtual model) of the hand motion may then be programmatically created, without forming a manual representation using a three-dimensional graphics editor. The representation can be shared with viewers (e.g., via a see-through display of an augmented-reality device), enabling the hand motion—without the irrelevant background environment—to be perceived from different angles and positions in a viewer's own environment.

In some scenarios, recorded hand motion may be performed relative to one or more objects. As examples, a user's hands may rotate a screwdriver to unscrew a threaded object, open a panel, or otherwise manipulate an object. The disclosed examples provide for recognizing an object manipulated by the user and the pose of the user's hands relative to the object as the hands undergo motion. At the viewer side, an instance of that object, or a related object, in the viewer's environment may also be recognized. The user's hand motion may be displayed relative to the viewer's instance of the object, and with the changing pose that was recorded in the user's environment as the hands underwent motion. Examples are also disclosed in which hand-object interaction is parameterized. In some examples in which hand motion is recorded as part of a tutorial in another educational/instructive context, the user may be referred to as an "instructor", and the viewer a "student" (e.g., of the instructor).

Other spatial variables of recorded hand motion may be preserved between user and viewer sides. For example, one or more of the position, orientation, and scale of a user's hand motion relative to an object may be recorded, such that the recorded hand motion can be displayed at the viewer's side with the (e.g., substantially same) recorded position, orientation, and scale relative to a viewer's instance of the object. The display of recorded hand motion and/or object instances with one or more spatial attributes consistent with those assumed by the hand motion/object instances when recorded may be referred to as "spatial consistency". By displaying recorded hand motion in such a spatially consistent manner, the viewer may gain a clear and intuitive understanding of the hand motion and how it relates to the object, making the hand motion easier to mimic. Further, spatial consistency may help give the viewer the impression that the user is present in the viewer's environment. This presence may be of particular benefit where hand motion is recorded as part of an instructive tutorial intended to teach the viewer a task.

Figure 1B:
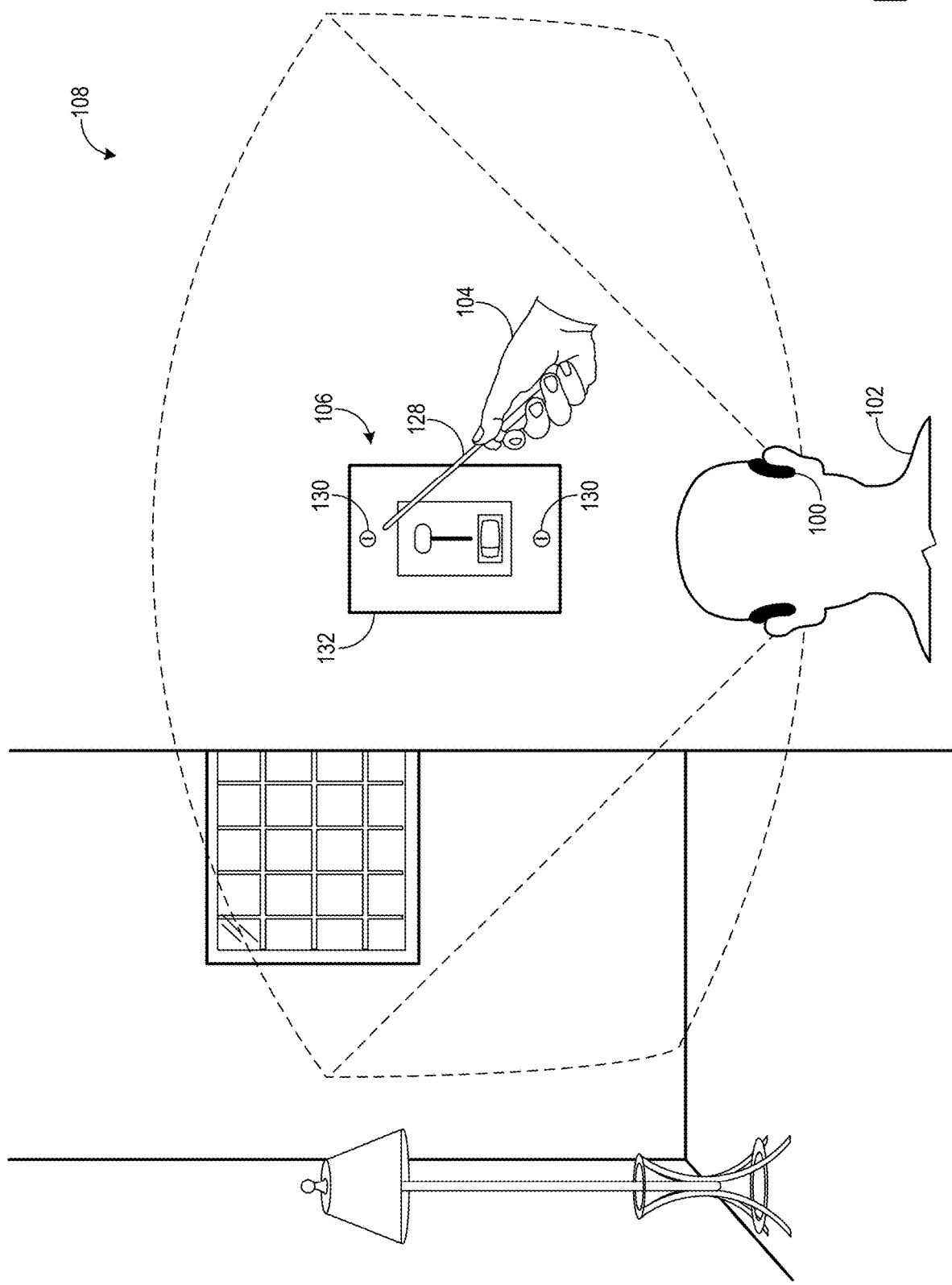

As one example of how hand motion may be recorded in one location and later shared with viewers in other locations, FIGS. 1A-1C illustrate respective steps in the recording process of a home repair guide. In the depicted example, an HMD device 100 worn by an instructor 102 is used to record motion of the right hand 104 of the instructor, and to image various objects manipulated by the instructor as described below. Instructor 102 performs hand motion in demonstrating how to repair a dimming light switch 106 in an environment 108 occupied by instructor 102. The examples disclosed herein may utilize any suitable device to record hand motion, however, including but not limited to a video camera, a depth camera (e.g., including one or more time-of-flight or structured light depth sensors), and any suitable combination of such devices.

FIG. 1A represents a particular instance of time in the recording process at which instructor 102 is gesticulating toward light switch 106 with hand 104, and is narrating the current step in the repair process, as represented by speech bubble 110. HMD device 100 records video data capturing motion of hand 104. In some examples, HMD device 100 may record audio data capturing the speech uttered by instructor 102, and/or eye-tracking data that enables the determination of a gaze point 112 representing the location at which the instructor is looking. The video data may capture both motion of hand 104 and portions of instructor environment 108 that are irrelevant to the hand motion and repair of light switch 106. Accordingly, the video data may be processed to discard the irrelevant portions and create a representation of the hand motion that can be shared with viewers located in other environments. As described below, in some examples this representation may include a three-dimensional video representation of the hand motion.

FIG. 2A illustrates the playback of represented hand motion in a viewer environment 200 different from the instructor environment 108 in which the hand motion was recorded. FIG. 2A depicts an instant of time during playback that corresponds to the instant of time of the recording process depicted in FIG. 1A. Via a display 202 of an HMD device 204 worn by a viewer 206, a representation 208 of the motion of hand 104 recorded in instructor environment 108 is displayed relative to a light switch 210 in viewer environment 200. Representation 208 resembles hand 104 and is animated with the hand's time-varying pose recorded by HMD device 100 (e.g., by configuring the representation with its own time-varying pose that substantially tracks the time-varying pose of the real hand). In this way, the hand motion recorded in instructor environment 108 may be played back in viewer environment 200 without displaying irrelevant portions of the instructor environment. As described below, representation 208 may also be played back with respect to relevant objects of interest—e.g., objects manipulated by hand motion—where the objects may be used to depict hand motion in the appropriate spatial context.

Representation 208 is displayed upon the determination by HMD device 204 that the object which the representation should be displayed in relation to—viewer light switch 210—corresponds to the object that the hand motion was recorded in relation to—instructor light switch 106. HMD device 204 may receive data indicating an identity, object type/class, or the like of instructor light switch 106 obtained from the recognition of the light switch by HMD device 100. HMD device 204 itself may recognize viewer light switch 210, and determine that the viewer light switch corresponds to instructor light switch 106.

Viewer light switch 210 is referred to as a "second instance" of a designated object (in this case, a light switch), and instructor light switch 106 is referred to as a "first instance" of the designated object. As described below, light switch 106 may be identified as a designated object based on user input from instructor 102, via hand tracking, through automatic detection as a relevant object of interest (e.g., based on a virtual model representing the object) and/or inferred during the recording of hand motion. As represented by the examples shown in FIGS. 1A and 2A, object instances may be the same model of an object. Object instances may exhibit any suitable correspondence, however—for example, object instances may be a similar but different model of object, or of the same object class. As such, hand motion recorded in relation to a first object instance may be represented in relation to a second object instance that differs in model, type, or in any other suitable attribute. As described in further detail below with reference to FIG. 6, any suitable object recognition/detection techniques may be used to detect an object instance as a designated object instance, to detect the correspondence of an object instance to another object instance, or to recognize, identify, and/or detect an object instance in general.

In addition to animating representation 208 in accordance with the time-varying pose of hand 104 recorded in instructor environment 108, the representation may be consistent with other attributes of the recorded hand motion. With respect to the time instances depicted in FIGS. 1A and 2A, the three-dimensional position (e.g., x/y/z), three-dimensional orientation (e.g., yaw/pitch/roll), and scale of representation 208 relative to light switch 210 are substantially equal to the three-dimensional position, three-dimensional orientation, and scale of hand 104 relative to light switch 106. Such spatial consistency may be maintained throughout playback of the recorded hand motion. As described in further detail below, spatial consistency may be achieved by associating recorded hand motion and its representation with respective object-centric coordinate systems specific to the objects they are recorded/displayed in relation to.

Even with such spatial consistency, viewer 206 may perceive a different portion of hand 104—via representation 208—than the portion of the hand recorded by HMD device 100. This arises from viewer 206 perceiving viewer light switch 210 from an angle that is significantly different than the angle from which instructor light switch 106 was recorded by HMD device 100. By altering the position, angle, and distance from which representation 208 is viewed, viewer 206 may observe different portions of the recorded hand motion.

Other aspects of the demonstration recorded in instructor environment 108 may be represented in viewer environment 200. As examples, FIG. 2A illustrates the playback at HMD device 204 of the narration spoken by instructor 102, and the display of gaze point 112 at a position relative to light switch 210 that is consistent with its position determined relative to light switch 106. The playback of instructor narration and gaze point may provide additional information that helps viewer 114 understand how to perform the task at hand. FIG. 2A also shows the output, via display 202, of controls 212 operable to control the playback of recorded hand motion. For example, controls 212 may be operable to pause, fast forward, and rewind playback of recorded hand motion, and to move among different sections in which the recording is divided.

Objects manipulated through hand motion recorded in instructor environment 108 may be represented and displayed in locations other than the instructor environment. Referring again to the recording process carried out by instructor 102, FIG. 1B depicts an instance of time at which the instructor handles a screwdriver 128 in the course of removing screws 130 from a panel 132 of light switch 106. HMD device 100 may collect image data capturing screwdriver 128, where such data is used to form a representation of the screwdriver for display at another location. As described in further detail below, data enabling the representation of screwdriver 128—and other objects manipulated recorded hand motion—may be collected as part of the hand motion recording process, or in a separate step in which manipulated objects are separately scanned.

Figure 2B:
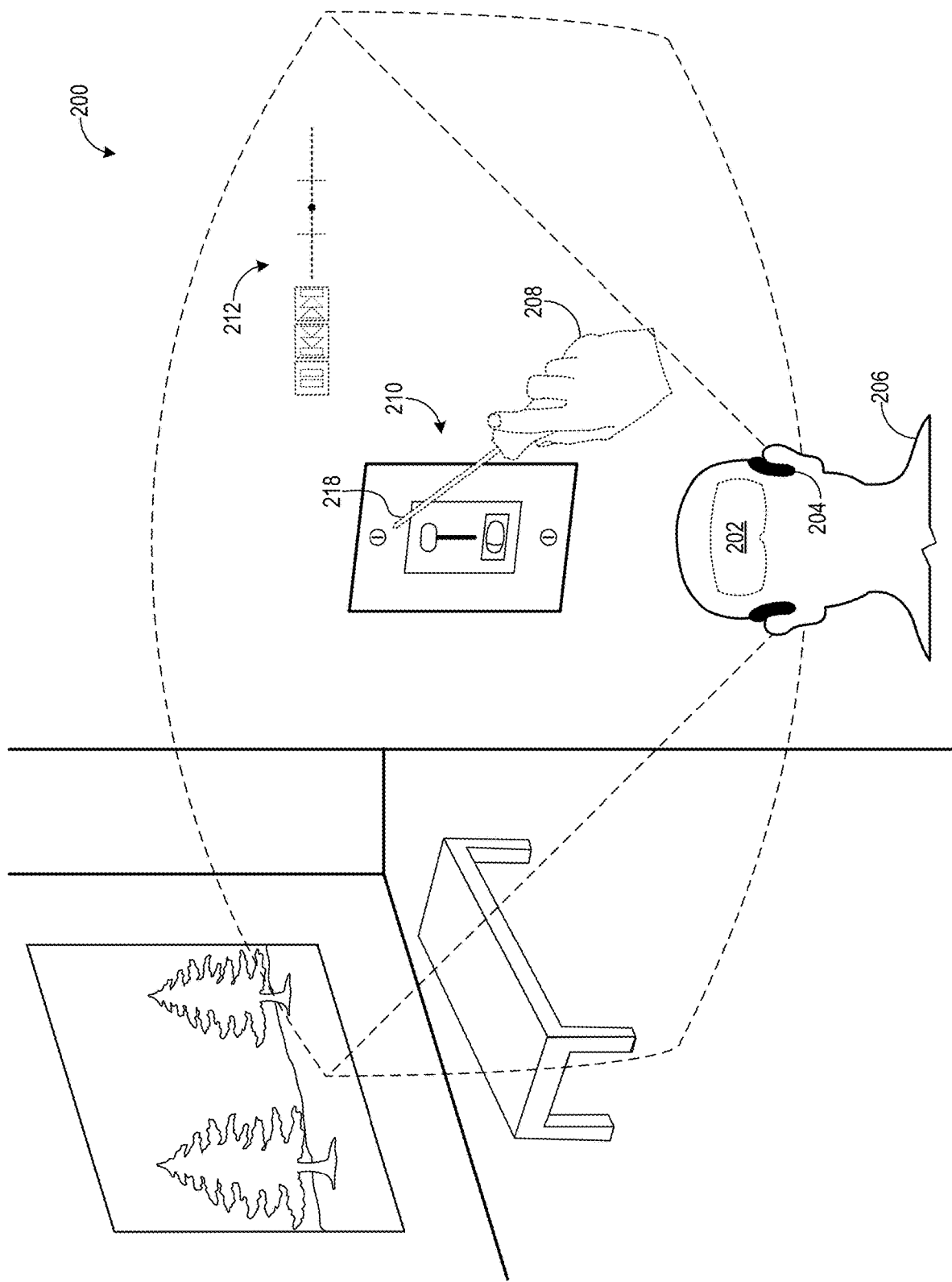

Referring to viewer environment 200, FIG. 2B shows the output, via display 202, of hand representation 208 holding a screwdriver representation 218. FIG. 2B depicts an instant of time during playback that corresponds to the instant of time of the recording process depicted in FIG. 1B. As with representation 208 alone, the collective representation of hand 104 holding screwdriver 128 is displayed relative to viewer light switch 210 in a manner that is spatially consistent with the real hand and screwdriver relative to instructor light switch 106. As described below, representation 208 of hand 104 may be associated with an object-centric coordinate system determined for screwdriver 128 for the duration that the hand manipulates the screwdriver. Further, representation 218 of screwdriver 128 may be displayed for the duration that the screwdriver is manipulated or otherwise undergoes motion. Once screwdriver 128 remains substantially stationary for a threshold duration, the display of representation 218 may cease. Any other suitable conditions may control the display of hand/object representations and other virtual imagery on display 202, however, including user input from instructor 102.

In some examples, a removable part of a designated object may be manipulated by recorded hand motion and represented in another location. Referring again to the recording process carried out by instructor 102, FIG. 1C depicts an instance of time at which the instructor handles panel 132 after having removed the panel from light switch 106. HMD device 100 may collect image data capturing panel 132, where such data is used to form a representation of the panel for display at another location.

Referring to viewer environment 200, FIG. 2C shows the output, via display 202, of hand representation 208 holding a representation 220 of panel 132. FIG. 2C depicts an instant of time during playback that corresponds to the instant of time of the recording process depicted in FIG. 1C. The collective representation of hand 104 holding screwdriver 128 is displayed relative to viewer light switch 210 in a manner that is spatially consistent with the real hand holding the panel relative to instructor light switch 106.

FIGS. 1A-2C illustrate how hand motion recorded relative to one object instance in an environment may be displayed in a spatially consistent manner relative to a corresponding object instance in a different environment. The disclosed examples are applicable to any suitable context, however. As further examples, recorded hand motion may be shared to teach users how to repair home appliances, perform home renovations, diagnose and repair vehicle issues, and play musical instruments. In professional settings, recorded hand motion may be played back to on-board new employees, to train doctors on medical procedures, and to train nurses to care for patients. Other contexts are possible in which recorded hand motion is shared for purposes other than learning and instruction, such as interactive (e.g., gaming) and non-interactive entertainment contexts and artistic demonstrations. Further, examples are possible in which spatially consistent hand motion is carried between object instances in a common environment. For example, a viewer in a given environment may observe hand motion previously-recorded in that environment, where the recorded hand motion may be overlaid on a same or different object instance as the object instance that the hand motion was recorded in relation to.

Figure 3:
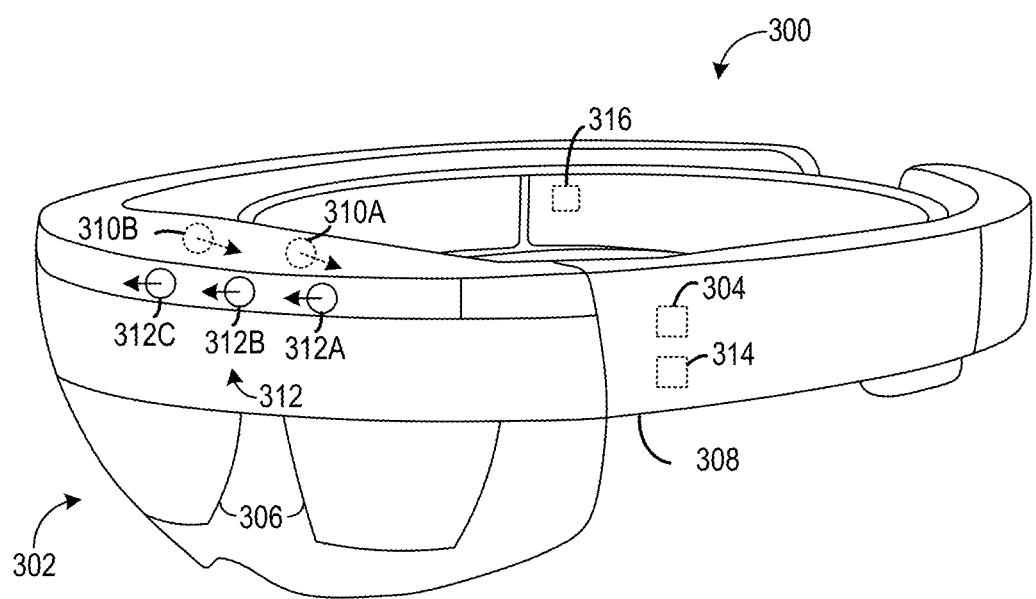
FIG. 3 shows an example head-mounted display (HMD) device.

FIG. 3 shows an example HMD device 300. As described in further detail below, HMD device 300 may be used to implement one or more phases of a pipeline in which hand motion recorded in one context is displayed in another context. Generally, these phases include (1) recording data capturing hand motion in one context (as illustrated in FIGS. 1A-1C), (2) processing the data to create a sharable representation of the hand motion, and (3) displaying the representation in another context (as illustrated in FIGS. 2A-2C). Aspects of HMD device 300 may be implemented in HMD device 100 and/or HMD device 204, for example.

HMD device 300 includes a near-eye display 302 configured to present any suitable type of visual experience. In some example, display 302 is substantially opaque, presenting virtual imagery as part of a virtual-reality experience in which a wearer of HMD device 300 is completely immersed in the virtual-reality experience. In other implementations, display 302 is at least partially transparent, allowing a user to view presented virtual imagery along with a real-world background viewable through the display to form an augmented-reality experience, such as a mixed-reality experience. In some examples, the opacity of display 302 is adjustable (e.g. via a dimming filter), enabling the display to function both as a substantially opaque display for virtual-reality experiences and as a see-through display for augmented reality experiences.

In augmented-reality implementations, display 302 may present augmented-reality objects that appear display-locked and/or world-locked. A display-locked augmented-reality object may appear to move along with a perspective of the user as a pose (e.g., six degrees of freedom (DOF): x/y/z/yaw/pitch/roll) of HMD device 300 changes. As such, a display-locked, augmented-reality object may appear to occupy the same portion of display 302 and may appear to be at the same distance from the user, even as the user moves in the surrounding physical space. A world-locked, augmented-reality object may appear to remain in a fixed location in the physical space, even as the pose of HMD device 300 changes. In some examples, a world-locked object may appear to move in correspondence with movement of a real, physical object. In yet other examples, a virtual object may be displayed as body-locked, in which the object is located to an estimated pose of a user's head or other body part.

HMD device 300 may take any other suitable form in which a transparent, semi-transparent, and/or non-transparent display is supported in front of a viewer's eye(s). Further, examples described herein are applicable to other types of display devices, including other wearable display devices and non-wearable display devices such as a television, monitor, and mobile device display. In some examples, a display device including a non-transparent display may be used to present virtual imagery. Such a display device may overlay virtual imagery (e.g., representations of hand motion and/or objects) on a real-world background presented on the display device as sensed by an imaging system.

Any suitable mechanism may be used to display images via display 302. For example, display 302 may include image-producing elements located within lenses 306. As another example, display 302 may include a liquid crystal on silicon (LCOS) device or organic light-emitting diode (OLED) microdisplay located within a frame 308. In this example, the lenses 306 may serve as, or otherwise include, a light guide for delivering light from the display device to the eyes of a wearer. In yet other examples, display 302 may include a scanning mirror system (e.g., a microelectromechanical display) configured to scan light from a light source in one or more directions to thereby form imagery. In some examples, eye display 302 may present left-eye and right-eye imagery via respective left-eye and right-eye displays.

HMD device 300 includes an on-board computer 304 operable to perform various operations related to receiving user input (e.g., voice input and gesture recognition, eye gaze detection), recording hand motion and the surrounding physical space, processing data obtained from recording hand motion and the physical space, presenting imagery (e.g., representations of hand motion and/or objects) on display 302, and/or other operations described herein. In some implementations, some to all of the computing functions described above may be performed off board. Example computer hardware is described in more detail below with reference to FIG. 16.

HMD device 300 may include various sensors and related systems to provide information to on-board computer 304. Such sensors may include, but are not limited to, one or more inward facing image sensors 310A and 310B, one or more outward facing image sensors 312A, 312B, and 312C of an imaging system 312, an inertial measurement unit (IMU) 314, and one or more microphones 316. The one or more inward facing image sensors 310A, 310B may acquire gaze tracking information from a wearer's eyes (e.g., sensor 310A may acquire image data for one of the wearer's eye and sensor 310B may acquire image data for the other of the wearer's eye). One or more such sensors may be used to implement a sensor system of HMD device 300, for example.

Where gaze-tracking sensors are included, on-board computer 304 may determine gaze directions of each of a wearer's eyes in any suitable manner based on the information received from the image sensors 310A, 310B. The one or more inward facing image sensors 310A, 310B, and on-board computer 304 may collectively represent a gaze detection machine configured to determine a wearer's gaze target on display 302. In other implementations, a different type of gaze detector/sensor may be employed to measure one or more gaze parameters of the user's eyes. Examples of gaze parameters measured by one or more gaze sensors that may be used by on-board computer 304 to determine an eye gaze sample may include an eye gaze direction, head orientation, eye gaze velocity, eye gaze acceleration, change in angle of eye gaze direction, and/or any other suitable tracking information. In some implementations, gaze tracking may be recorded independently for both eyes.

Imaging system 312 may collect image data (e.g., images, video) of a surrounding physical space in any suitable form. Image data collected by imaging system 312 may be used to measure physical attributes of the surrounding physical space. While the inclusion of three image sensors 312A-312C in imaging system 312 is shown, the imaging system may implement any suitable number of image sensors. As examples, imaging system 312 may include a pair of greyscale cameras (e.g., arranged in a stereo formation) configured to collect image data in a single color channel. Alternatively or additionally, imaging system 312 may include one or more color cameras configured to collect image data in one or more color channels (e.g., RGB) in the visible spectrum. Alternatively or additionally, imaging system 312 may include one or more depth cameras configured to collect depth data. In one example, the depth data may take the form of a two-dimensional depth map having a plurality of depth pixels that each indicate the depth from a corresponding depth camera (or other part of HMD device 300) to a corresponding surface in the surrounding physical space. A depth camera may assume any suitable form, such as that of a time-of-flight depth camera or a structured light depth camera. Alternatively or additionally, imaging system 312 may include one or more infrared cameras configured to collect image data in the infrared spectrum. In some examples, an infrared camera may be configured to function as a depth camera. In some examples, one or more cameras may be integrated in a common image sensor—for example, an image sensor may be configured to collect RGB color data and depth data.

Data from imaging system 312 may be used by on-board computer 304 to detect movements, such as gesture-based inputs or other movements performed by a wearer, person, or physical object in the surrounding physical space. In some examples, HMD device 300 may record hand motion performed by a wearer by recording image data via imaging system 312 capturing the hand motion. HMD device 300 may also image objects manipulated by hand motion via imaging system 312. Data from imaging system 312 may be used by on-board computer 304 to determine direction/location and orientation data (e.g., from imaging environmental features) that enables position/motion tracking of HMD device 300 in the real-world environment. In some implementations, data from imaging system 312 may be used by on-board computer 304 to construct still images and/or video images of the surrounding environment from the perspective of HMD device 300. In some examples, HMD device 300 may utilize image data collected by imaging system 312 to perform simultaneous localization and mapping (SLAM) of the surrounding physical space.

IMU 314 may be configured to provide position and/or orientation data of HMD device 300 to on-board computer 304. In one implementation, IMU 314 may be configured as a three-axis or three-degree of freedom (3 DOF) position sensor system. This example position sensor system may, for example, include three gyroscopes to indicate or measure a change in orientation of HMD device 300 within three-dimensional space about three orthogonal axes (e.g., roll, pitch, and yaw).

In another example, IMU 314 may be configured as a six-axis or six-degree of freedom (6 DOF) position sensor system. Such a configuration may include three accelerometers and three gyroscopes to indicate or measure a change in location of HMD device 300 along three orthogonal spatial axes (e.g., x/y/z) and a change in device orientation about three orthogonal rotation axes (e.g., yaw/pitch/roll). In some implementations, position and orientation data from imaging system 312 and IMU 314 may be used in conjunction to determine a position and orientation (or 6 DOF pose) of HMD device 300. In yet other implementations, the pose of HMD device 300 may be computed via visual inertial SLAM.

HMD device 300 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The one or more microphones 316 may be configured to collect audio data from the surrounding physical space. Data from the one or more microphones 316 may be used by on-board computer 304 to recognize voice commands provided by the wearer to control the HMD device 300. In some examples, HMD device 300 may record audio data via the one or more microphones 316 by capturing speech uttered by a wearer. The speech may be used to annotate a demonstration in which hand motion performed by the wearer is recorded.

While not shown in FIG. 3, on-board computer 304 may include a logic subsystem and a storage subsystem holding instructions executable by the logic subsystem to perform any suitable computing functions. For example, the storage subsystem may include instructions executable to implement one or more of the recording phase, editing phase, and display phase of the pipeline described above in which hand motion recorded in one context is displayed in another context. Example computing hardware is described below with reference to FIG. 16

Figure 4:
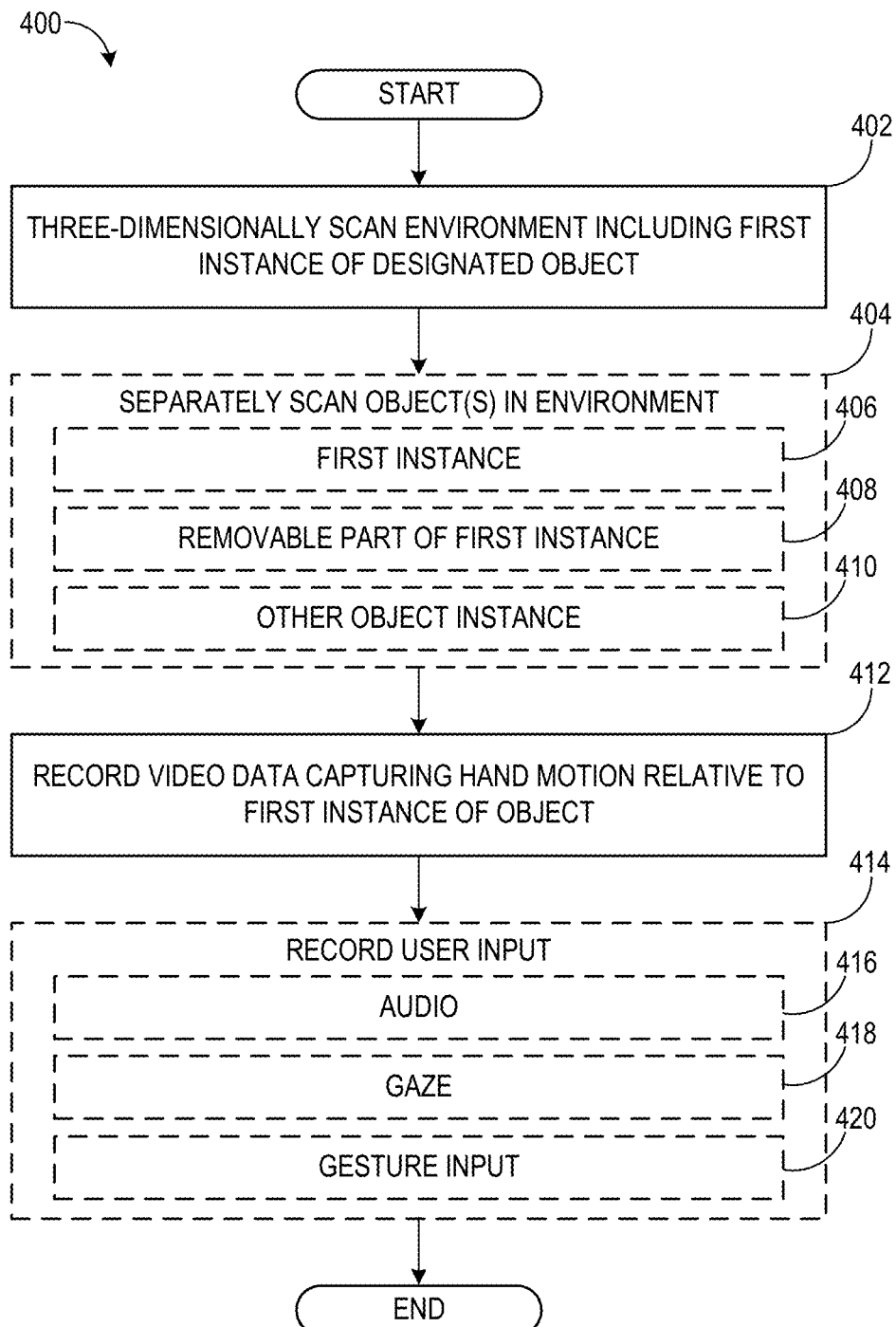
FIG. 4 shows a flowchart illustrating a method of recording hand motion.

FIG. 4 shows a flowchart illustrating a method 400 of recording hand motion. Method 400 may represent the first phase of the three-phase pipeline mentioned above in which hand motion recorded in one context is displayed in another context. Additional detail regarding the second and third phases is described below with reference to FIGS. 4 and 5. Further, reference to the examples depicted in FIGS. 1A-2C is made throughout the description of method 400. As such, method 400 may be at least partially implemented on HMD device 100. Method 400 also may be at least partially implemented on HMD device 204. However, examples are possible in which method 400 and the recording phase are implemented on a non-HMD device having a hardware configuration that supports the recording phase.

At 402, method 400 includes, at an HMD device, three-dimensionally scanning an environment including a first instance of a designated object. Here, the environment in which a demonstration including hand motion is to be performed is scanned. As examples, instructor environment 108 may be scanned using an imaging system integrated in HMD device 100, such as imaging system 312 of HMD device 300. The environment may be scanned by imaging the environment from different perspectives (e.g., via a wearer of the HMD device varying the perspective from which the environment is perceived by the HMD device), such that a geometric representation of the environment may be later constructed as described below. The geometric representation may assume any suitable form, such as that of a three-dimensional point cloud or mesh.

The environmental scan also includes scanning the first instance of the designated object, which occupies the environment. The first instance is an object instance that at least a portion of hand motion is performed in relation to. For example, the first instance may be instructor light switch 106 in instructor environment 108. As with the environment, the first instance may be scanned from different angles to enable a geometric representation of the first instance to be formed later.

At 404, method 400 optionally includes separately scanning one or more objects in the environment. In some examples, object(s) to be manipulated by later hand motion or otherwise involved in a demonstration to be recorded may be scanned in discrete step separate from the environmental scan conducted at 402. Separately scanning the object(s) may include, at 406, scanning the first instance of the designated object; at 408, scanning a removable part of the first instance (e.g., panel 132 of instructor light switch 106); and/or, at 410, scanning an object instance other than the first instance of the designated object (e.g., screwdriver 128).

Figure 5:
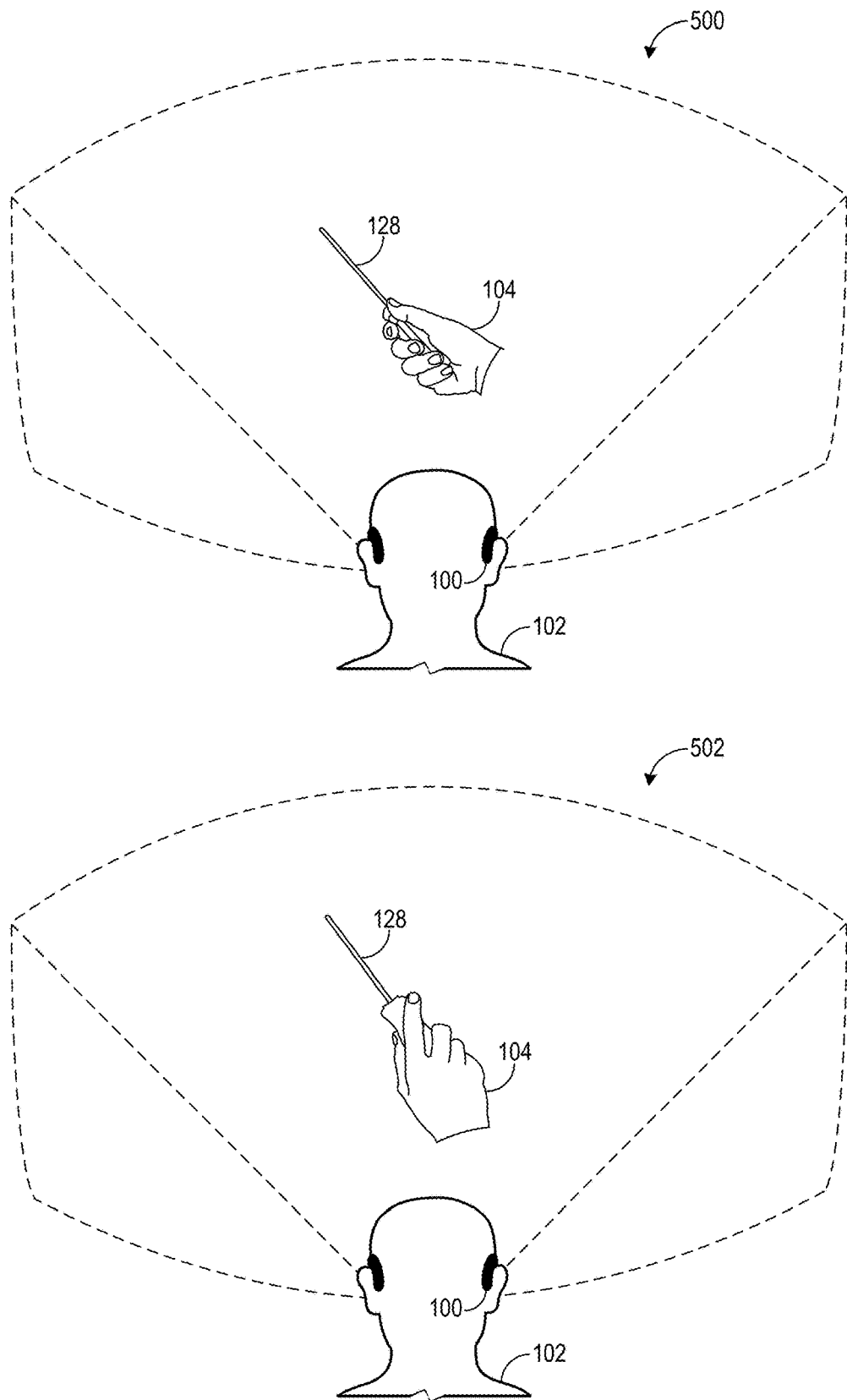
FIG. 5 illustrates separately scanning an object instance.

FIG. 5 illustrates how a separate scanning step may be conducted by instructor 102 via HMD device 102 for screwdriver 128. At a first instance of time indicated at 500, screwdriver 128 is scanned from a first perspective. At a second instance of time indicated at 502, screwdriver 128 is scanned from a second perspective obtained by instructor 102 changing the orientation of the screwdriver through hand motion. By changing the orientation of an object instance through hand motion, sufficient image data corresponding to the object instance may be obtained to later construct a geometric representation of the object instance. This may enable a viewer to perceive the object instance from different angles, and thus see different portions of the object instance, via the geometric representation. Any suitable mechanism may be employed to scan an object instance from different perspectives, however. For scenarios in which separately scanning an object instance is impracticable (e.g., for a non-removable object instance fixed in a surrounding structure), the object instance instead may be scanned as part of scanning its surrounding environment. In other examples, a representation of an object instance in the form of a virtual model of the object instance may be created, instead of scanning the object instance. For example, the representation may include a three-dimensional representation formed in lieu of three-dimensionally scanning the object instance. Three-dimensional modeling software, or any other suitable mechanism, may be used to create the virtual model. The virtual model, and a representation of hand motion performed in relation to the virtual model, may be displayed in an environment other than that in which the hand motion is recorded.

Returning to FIG. 4, at 412, method 400 includes recording video data capturing motion of a hand relative to the first instance of the designated object. For example, HMD device 100 may record video data capturing motion of hand 104 of instructor 102 as the hand gesticulates relative to light switch 106 (as shown in FIG. 1A), handles screwdriver 128 (as shown in FIG. 1B), and handles panel 132 (as shown in FIG. 1C). The video data may assume any suitable form—for example, the video data may include a sequence of three-dimensional point clouds or meshes captured at 30 Hz or any other suitable rate. Alternatively or additionally, the video data may include RGB and/or RGB+D video, where D refers to depth map frames acquired via one or more depth cameras. As the field of view in which the video data is captured may include both relevant object instances and irrelevant portions of the background environment, the video data may be processed to discard the irrelevant portions as described below. In other examples, non-HMD devices may be used to record hand motion, however, including but not limited to a mobile device (e.g., smartphone), video camera, and webcam.

At 414, method 400 optionally includes recording user input from the wearer of the HMD device. User input may include audio 416, which in some examples may correspond to narration of the recorded demonstration by the wearer—e.g., the narration spoken by instructor 102. User input may include gaze 418, which as described above may be determined by a gaze-tracking system implemented in the HMD device. User input may include gesture input 420, which may include gaze gestures, hand gestures, or any other suitable form of gesture input. As described below, gesture input from the wearer of the HMD device may be used to identify the designated object that hand motion is recorded in relation to.

As mentioned above, a pipeline in which hand motion recorded in one context is displayed in another context may include a processing phase following the recording phase in which hand motion and related objects are captured. In the processing phase, data obtained in the recording phase may be processed to remove irrelevant portions corresponding to the background environment, among other purposes. In some examples, at least a portion of the processing phase may be implemented at a computing device different than an HMD device at which the recording phase is conducted.

Figure 6:
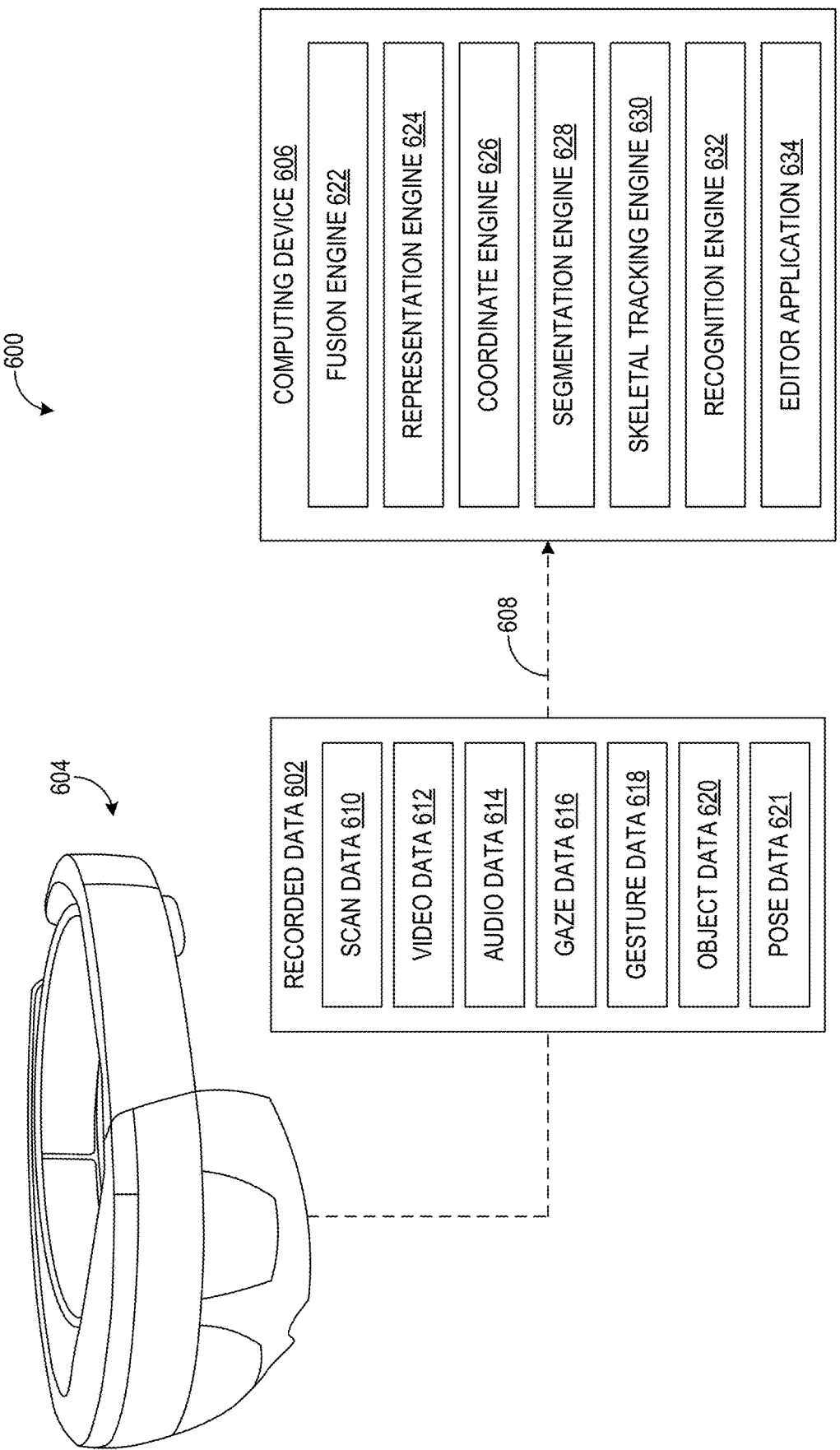
FIG. 6 schematically shows an example system in which recorded data is transmitted to a computing device.

FIG. 6 schematically shows an example system 600 in which recorded data 602 obtained by an HMD device 604 from recording hand motion and associated object(s) is transmitted to a computing device 606 configured to process the recorded data. HMD device 604 may be instructor HMD device 100 or HMD device 300, as examples. Computing device 606 may implement aspects of an example computing system described below with reference to FIG. 16. HMD device 604 and computing device 606 are communicatively coupled via a communication link 608. Communication link 608 may assume any suitable wired or wireless form, and may directly or indirectly couple HMD device 604 and computing device 606 through one or more intermediate computing and/or network devices. In other examples, however, at least a portion of recorded data 602 may be obtained by a non-HMD device, such as a mobile device (e.g., smartphone), video camera, and webcam.

Recorded data 602 may include scan data 610 including scan data capturing an environment (e.g., instructor environment 108) and an instance of a designated object (e.g., light switch 106) in the environment. Scan data 610 may assume any suitable form, such as that of three-dimensional point cloud or mesh data. Recorded data 602 may include video data 612 capturing motion of a hand (e.g., hand 104), including hand motion alone and/or hand motion performed in the course of manipulating an object instance. Video data 612 may include a sequence of three-dimensional point clouds or meshes, as examples.

Further, recorded data 602 may include audio data 614, for example audio data corresponding to narration performed by a wearer of HMD device 604. Recorded data 602 may include gaze data 616 representing a time-varying gaze point of the wearer of HMD device 604. Recorded data 602 may include gesture data 618 representing gestural input (e.g., hand gestures) performed by the wearer of HMD device 604. Further, recorded data 602 may include object data 620 corresponding to one or more object instances that are relevant to the hand motion captured in the recorded data. In some examples, object data 620 may include, for a given relevant object instance, an identity of the object, an identity of a class or type of the object, and/or output from a recognizer fed image data capturing the object instance. Generally, object data 620 may include data that, when received by another HMD device in a location different from that of HMD device 604, enables the other HMD device to determine that an object instance in the different location is an instance of the object represented by the object data. Finally, recorded data 602 may include pose data 621 indicating a sequence of poses of HMD device 604 and/or the wearer of the HMD device. Poses may be determined via data from an IMU and/or via SLAM as described above.

Computing device 606 includes various engines configured to process recorded data 602 received from HMD device 604. Specifically, computing device 606 may include a fusion engine 622 configured to fuse image data from different image sensors. In one example, video data 612 in recorded data 602 may include image data from one or more of greyscale, color, infrared, and depth cameras. Via fusion engine 622, computing device 606 may perform dense stereo matching of image data received from a first greyscale camera and of image data received from a second greyscale camera to obtain a depth map, based on the greyscale camera image data, for each frame in video data 612. Via fusion engine 622, computing device 606 may then fuse the greyscale depth maps with temporally corresponding depth maps obtained by a depth camera. As the greyscale depth maps and the depth maps obtained by the depth camera may have a different field of view and/or framerate, fusion engine 622 may be configured to fuse image data of such differing attributes.

Computing device 606 may include a representation engine 624 configured to determine static and/or time-varying representations of the environment captured in recorded data 602. Representation engine 624 may determine a time-varying representation of the environment based on fused image data obtained via fusion engine 622. In one example in which fused image frames are obtained by fusing a sequence of greyscale image frames and a sequence of depth frames, representation engine 624 may determine a sequence of three-dimensional point clouds based on the fused image frames. Then, color may be associated with each three-dimensional point cloud by projecting points in the point cloud into spatially corresponding pixels of a temporally corresponding image frame from a color camera. This sequence of color point clouds may form the time-varying representation of the environment, which also may be referred to as a four-dimensional reconstruction of the environment. In this example, the time-varying representation comprises a sequence of frames each consisting of a three-dimensional point cloud with per-point (e.g., RGB) color. The dynamic elements of the time-varying (e.g., three-dimensional) representation may include hand(s) undergoing motion and object instances manipulated in the course of such hand motion. Other examples are possible in which representation engine 624 receives or determines a non-scanned representation of an object instance—e.g., a virtual (e.g., three-dimensional) model of the object instance.

In some examples, representation engine 624 may determine a static representation of the environment in the form of a three-dimensional point cloud reconstruction of the environment. The static representation may be determined based on one or more of scan data 610, video data 612, and pose data 621, for example. In particular, representation engine 624 may determine the static representation via any suitable three-dimensional reconstruction algorithms, including but not limited to structure from motion and dense multi-view stereo reconstruction algorithms (e.g., based on image data from color and/or greyscale cameras, or based on a surface reconstruction of the environment based on depth data from a depth camera).

FIG. 7 shows an example static representation 700 of instructor environment 108 of FIGS. 1A-1C. In this example, static representation 700 includes a representation of the environment in the form of a three-dimensional point cloud or mesh, with different surfaces in the representation represented by different textures. FIG. 7 illustrates representation 700 from one angle, but as the representation is three-dimensional, the angle from which it is viewed may be varied. FIG. 7 also shows an example time-varying representation of the environment in the form of a sequence 702 of point cloud frames. Unlike static representation 700, the time-varying representation includes image data corresponding to hand motion performed in the environment.

In some examples, a static representation may be determined in a world coordinate system different than a world coordinate system in which a time-varying representation is determined. As a brief example, FIG. 7 shows a first world coordinate system 704 determined for static representation 700, and a second world coordinate system 706 determined for the time-varying representation. Accordingly, computing device 606 may include a coordinate engine 626 configured to align the differing world coordinate systems of static and time-varying representations and thereby determine an aligned world coordinate system. The coordinate system alignment process may be implemented in any suitable manner, such as via image feature matching and sparse 3D-3D point cloud registration algorithms. In other examples, dense alignment algorithms or iterated closest point (ICP) techniques may be employed.

As described above, the field of view in which video data 612 is captured may include relevant hand motion and object instances, and irrelevant portions of the background environment. Accordingly, computing device 606 may include a segmentation engine 628 configured to segment a relevant foreground portion of the video data, including relevant hand motion and object instances, from an irrelevant background portion of the video data, including irrelevant motion and a static background of the environment. In one example, segmentation engine 628 performs segmentation on a sequence of fused image frames obtained by fusing a sequence of greyscale image frames and a sequence of depth frames as described above. The sequence of fused image frames may be compared to the static representation of the environment produced by representation engine 624 to identify static and irrelevant portions of the fused image frames. For example, the static representation may be used to identify points in the fused image data that remain substantially motionless, where at least a subset of such points may be identified as irrelevant background points. Any suitable (e.g., three-dimensional video) segmentation algorithms may be used. For example, a segmentation algorithm may attempt to identify the subset of three-dimensional points that within a certain threshold are similar to corresponding points in the static representation, and discard these points from the fused image frames. Here, the segmentation process may be likened to solving a three-dimensional change detection task.

Figure 8:
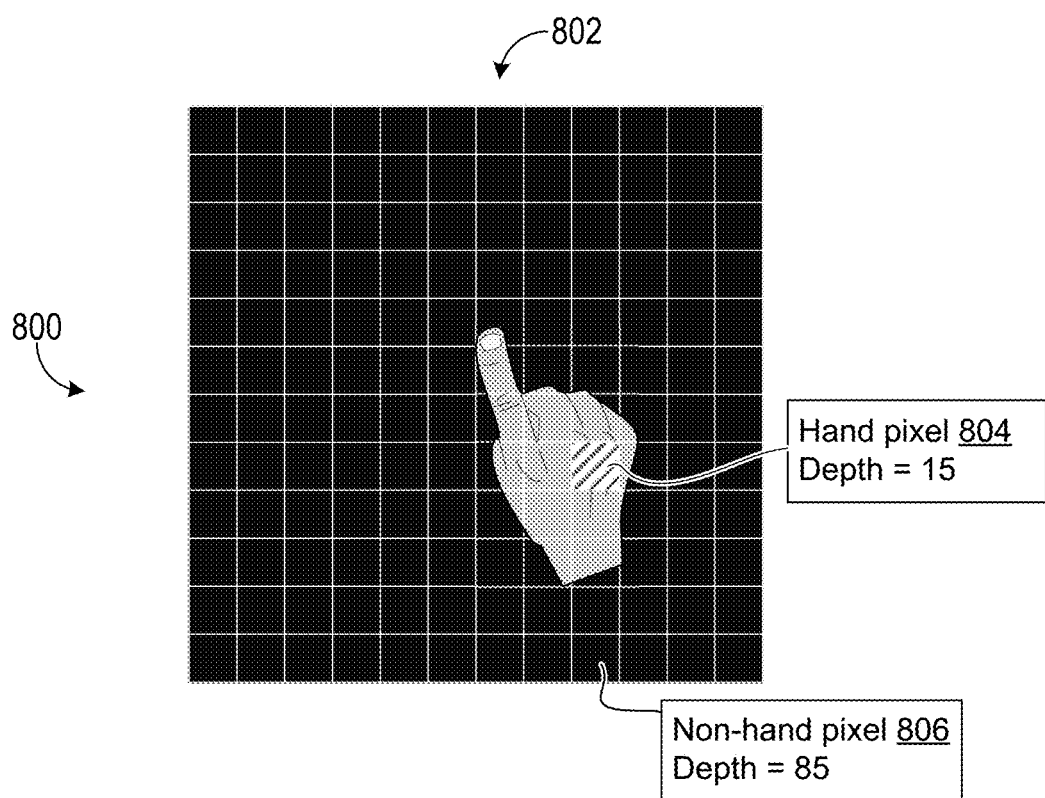
FIG. 8 shows an example image frame including a plurality of depth pixels.

As a particular example regarding the segmentation of hand motion, FIG. 8 shows an example image frame 800 including a plurality of pixels 802 that each specify a depth value of that pixel. Image frame 800 captures hand 104 of instructor 102 (FIGS. 1A-1C), which, by virtue of being closer to the image sensor that captured the image frame, has corresponding pixels with substantially lesser depth than pixels that correspond to the background environment. For example, a hand pixel 804 has a depth value of 15, whereas a non-hand pixel 806 has a depth value of 85. In this way, a set of hand pixels correspond to hand 104 may be identified and segmented from non-hand pixels. As illustrated by the example shown in FIG. 8, segmentation engine 628 may perform hand segmentation based on depth values for each frame having depth data in a sequence of such frames.

Returning to FIG. 6, in some examples segmentation engine 628 may receive, for a sequence of frames, segmented hand pixels that image a hand in that frame. Segmentation engine 628 may further label such hand pixels, and determine a time-varying geometric representation of the hand as it undergoes motion throughout the frames based on the labeled hand pixels. In some examples, the time-varying geometric representation may also be determined based on a pose of HMD 604 determined for each frame. The time-varying geometric representation of the hand motion may take any suitable form—for example, the time-varying geometric representation may include a sequence of geometric representations for each frame, with each representation including a three-dimensional point cloud encoding the pose of the hand in that frame. In this way, a representation of hand motion may be configured with a time-varying pose that corresponds (e.g., substantially matches or mimics) the time-varying pose of the real hand represented by the representation. In other examples, a so-called "2.5D" representation of hand motion may be generated for each frame, with each representation for a frame encoded as a depth map or height field mesh. Such 2.5D representations may be smaller compared to fully three-dimensional representations, making their storage, transmission, and rendering less computationally expensive.

In other examples, skeletal hand tracking may be used to generate a geometric representation of hand motion. As such, computing device 606 may include a skeletal tracking engine 630. Skeletal tracking engine 630 may receive labeled hand pixels determined as described above, and fit a skeletal hand model comprising a plurality of finger joints with variable orientations to the imaged hand. This in turn may allow representation engine 624 to fit a deformable mesh to the hand and ultimately facilitate a fully three-dimensional model to be rendered as a representation of the hand. This may enable the hand to be viewed from virtually any angle. In some examples, skeletal tracking may be used to track an imaged hand for the purpose of identifying a designated object.

In some examples, video data 612 may capture both the left and right hands of the wearer of HMD device 604. In these examples, both hands may be segmented via segmentation engine 628 and separately labeled as the left hand and right hand. This may enable separate geometric representation of the left and right hands to be displayed.

As mentioned above, segmentation engine 628 may segment object instances in addition to hand motion. For objects that undergo motion, including articulated motion about a joint, segmentation engine 628 may employ adaptive background segmentation algorithms to subtract irrelevant background portions. As examples of objects undergoing motion, in one demonstration an instructor may open a panel of a machine by rotating the panel about a hinge. Initially, the panel may be considered a foreground object instance that should be represented for later display by a viewer. Once the panel stops moving and is substantially motionless for at least a threshold duration, the lack of motion may be detected, causing the panel to be considered part of the irrelevant background. As such, the panel may be segmented, and the viewer may perceive the representation of the panel fade from display. To this end, a representation of the panel may include a transparency value for each three-dimensional point that varies with time.

Computing device 606 may further include a recognition engine 632 configured to recognize various aspects of an object instance. In some examples, recognition engine 632 further detect an object instance as a designated object instance, detect the correspondence of an object instance to another object instance, or to recognize, identify, and/or detect an object instance in general. To this end, recognition engine 632 may utilize any suitable machine vision and/or object recognition/detection/matching techniques.

Alternatively or additionally, recognition engine 632 may recognize the pose of an object instance. In some examples, a 6 DOF pose of the object instance may be recognized via any suitable 6D detection algorithm. More specifically, pose recognition may utilize feature matching algorithms (e.g., based on hand-engineered features) and robust fitting or learning-based methods. Pose recognition may yield a three-dimensional position (e.g., x/y/z) and a three-dimensional orientation (e.g., yaw/pitch/roll) of the object instance. Recognition engine 632 may estimate the pose of an object instance based on any suitable data in recorded data 602. As examples, the pose may be recognized based on color (e.g., RGB) images or images that include both color and depth values (e.g., RGB+D).

For an object instance that undergoes motion, a time-varying pose (e.g., a time-stamped sequence of 6 DOF poses) may be estimated for the object instance. In some examples, time intervals in which the object instance remained substantially motionless may be estimated, and a fixed pose estimate may be used for such intervals. Any suitable method may be used to estimate a time-varying pose, including but not limited to performing object detection/recognition on each of a sequence of frames, or performing 6 DOF object detection and/or tracking. As described below, an editor application may be used to receive user input for refining an estimated pose. Further, for an object instance that has multiple parts undergoing articulated motion, a 6 DOF pose may be estimated for each part.

Figure 9:
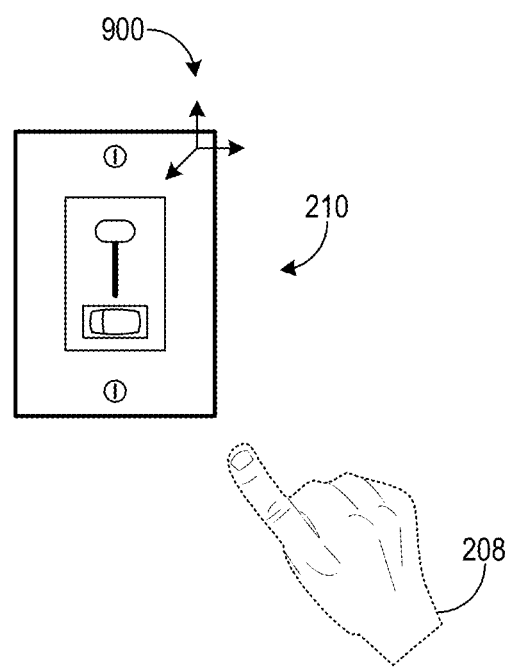
FIG. 9 illustrates an object-centric coordinate system.

For an object instance with an estimated pose, an object-centric coordinate system specific to that object instance may be determined. Segmented (e.g., three-dimensional) points on hand(s) recorded when hand motion was performed may be placed in the object-coordinate system by transforming the points using the estimated (e.g., 6 DOF) object pose, which may allow the hand motion to be displayed (e.g., on an augmented-reality device) relative to another object instance in a different scene in a spatially consistent manner. To this end, coordinate engine 626 may transform a geometric representation of hand motion from a world coordinate system (e.g., a world coordinate system of the time-varying representation) to an object-centric coordinate system of the object instance. As one example, FIG. 9 shows representation 208 (FIG. 2A) of hand 104 (FIG. 1) placed in an object-centric coordinate system 900 associated with viewer light switch 210. While shown as being placed toward the upper-right of light switch 210, the origin of coordinate system 900 may be placed at an estimated centroid of the light switch, and the coordinate system may be aligned with the estimated pose of the light switch.

Figure 10:
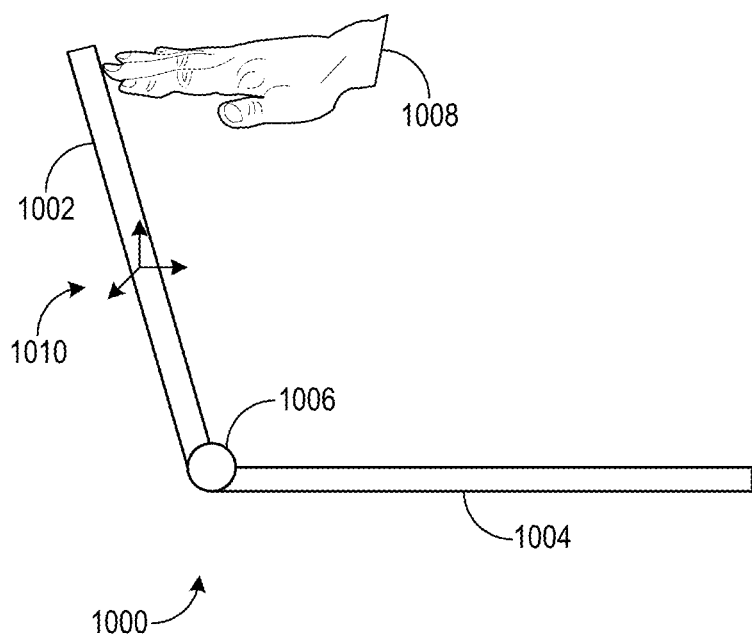
FIG. 10 shows an articulated object instance.

For an object instance with multiple parts that undergo articulated motion, a particular part of the object instance may be associated with its own object-centric coordinate system. As one example, FIG. 10 shows a laptop computing device 1000 including an upper portion 1002 coupled to a lower portion 1004 via a hinge 1006. A hand 1008 is manipulating upper portion 1002. As such, a coordinate system 1010 is associated with upper portion 1002, and not lower portion 1004. Coordinate system 1010 may remain the active coordinate system with which hand 1008 is associated until lower portion 1004 is manipulated, for example. Generally, the portion of an articulating object instance that is associated with an active coordinate system may be inferred by estimating the surface contact between a user's hands and the portion.

Figure 11:
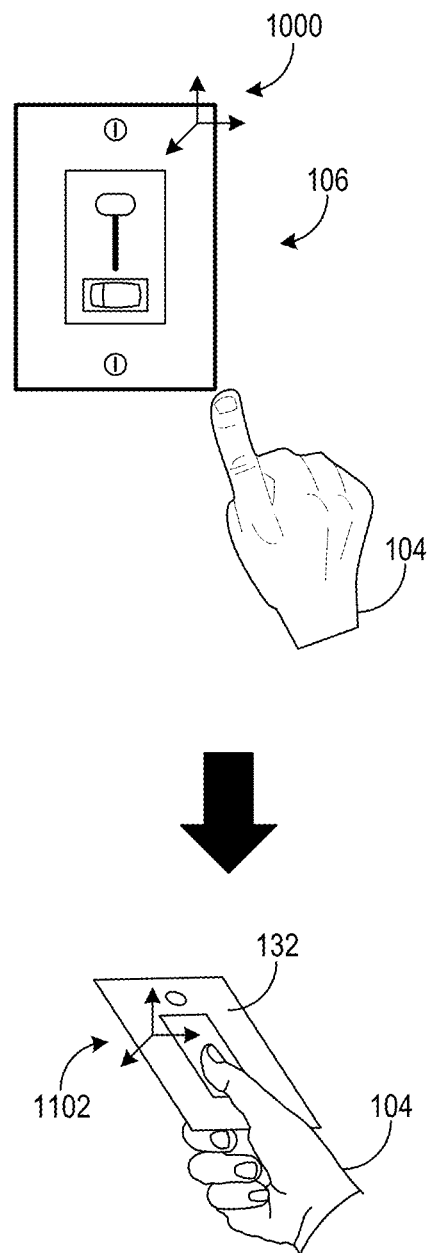
FIG. 11 illustrates switching object-centric coordinate systems.

For an object instance with removable parts, the active coordinate system may be switched among the parts according to the particular part being manipulated at any given instance. As one example, FIG. 11 shows a coordinate system 1100 associated with light switch 106 (FIG. 1A). At a later instance in time, panel 132 is removed from light switch 106 and manipulated by hand 104. Upon detecting that motion of hand 104 has changed from motion relative to light switch 106 to manipulation of panel 132, the active coordinate system is switched from coordinate system 1100 to a coordinate system 1102 associated with the panel. As illustrated by this example, each removable part of an object instance may have an associated coordinate system that is set as the active coordinate system while that part is being manipulated or is otherwise relative to hand motion. The removable parts of a common object may be determined based on object recognition, scanning each part separately, explicit user input identifying the parts, or in any other suitable manner. Further, other mechanisms for identifying the active coordinate system may be used, including setting the active coordinate system based on user input, as described below.

Figure 12:
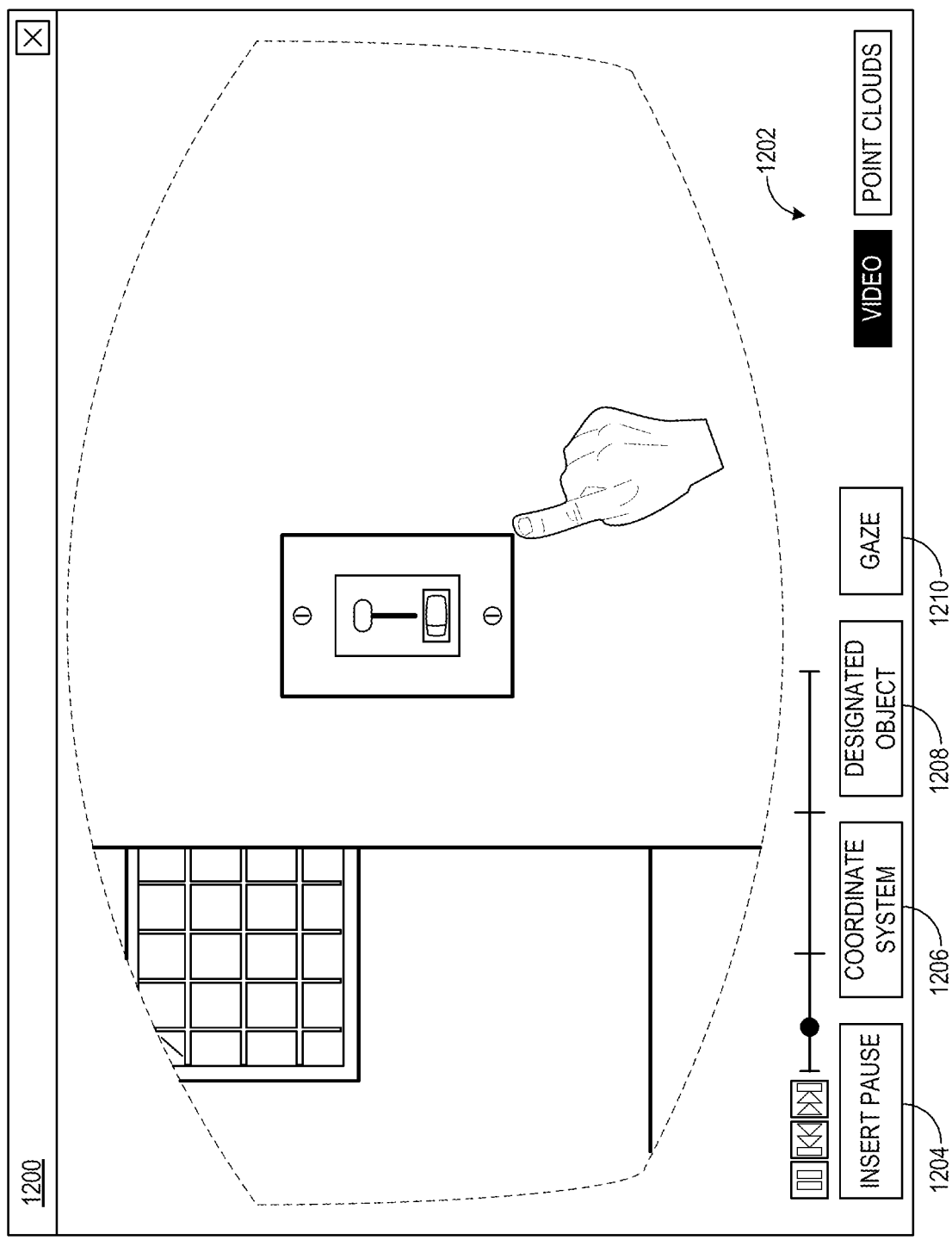
FIG. 12 shows an example graphical user interface of an editor application.

Returning to FIG. 6, computing device 606 may include an editor application 634 configured to receive user input for processing recorded data 602. FIG. 12 shows an example graphical user interface (GUI) 1200 of editor application 634. As shown, GUI 1200 may display video data 612 in recorded data 602, though any suitable type of image data in the recorded data may be represented in the GUI. Alternatively or additionally, GUI 1200 may display representations (e.g., three-dimensional point clouds) of hand motion and/or relevant object instances. In the depicted example, GUI 1200 is switchable between the display of video data and representations via controls 1202.

GUI 1200 may include other controls selectable to process recorded data 602. For example, GUI 1200 may include an insert pause control 1204 operable to insert pauses into playback of the recorded data 602. At a viewer's side, playback may be paused where the pauses are inserted. A user of application 1200 may specify the duration of each pause, that playback be resumed in response to receiving a particular input from the viewer, or any other suitable criteria. The user of application 1200 may insert pauses to divide the recorded demonstration into discrete steps, which may render the demonstration easier to follow. As an example, the instances of time respectively depicted in FIGS. 1A-1C may correspond to a respective step each separated from each other by a pause.

GUI 1200 may include a coordinate system control 1206 operable to identify, for a given time period in the recorded demonstration, the active coordinate system. In some examples, control 1206 may be used to place cuts where the active coordinate system changes. This may increase the accuracy with which hand motion is associated with the correct coordinate system, particularly for demonstrations that include the manipulation of moving and articulated object instances, and the removal of parts from object instances.

GUI 1200 may include a designated object 1208 control operable to identify the designated object that is relevant to recorded hand motion. This may supplement or replace at least a portion of the recognition process described above for determining the designated object. Further, GUI 1200 may include a gaze control 1210 operable to process a time-varying gaze in the recorded demonstration. In some examples, the gaze of an instructor may vary erratically and rapidly in the natural course of executing the demonstration. As such, gaze control 1210 may be used to filter, smooth, suppress, or otherwise process recorded gaze.

While FIG. 6 depicts the implementation of computing device 606 and its functions separately from HMD device 604, examples are possible in which aspects of the computing device are implemented at the HMD device. As such, HMD device 604 may perform at least portions of image data fusion, representation generation, coordinate alignment and association, segmentation, skeletal tracking, and recognition. Alternatively or additionally, HMD device 604 may implement aspects of editor application 634—for example by executing the application. This may enable the use of HMD 604 for both recording and processing a demonstration. In this example, a user of HMD device 604 may annotate a demonstration with text labels or narration (e.g., via one or more microphones integrated in the HMD device), oversee segmentation (e.g., via voice input or gestures), and insert pauses into playback, among other functions.

Figure 13A:
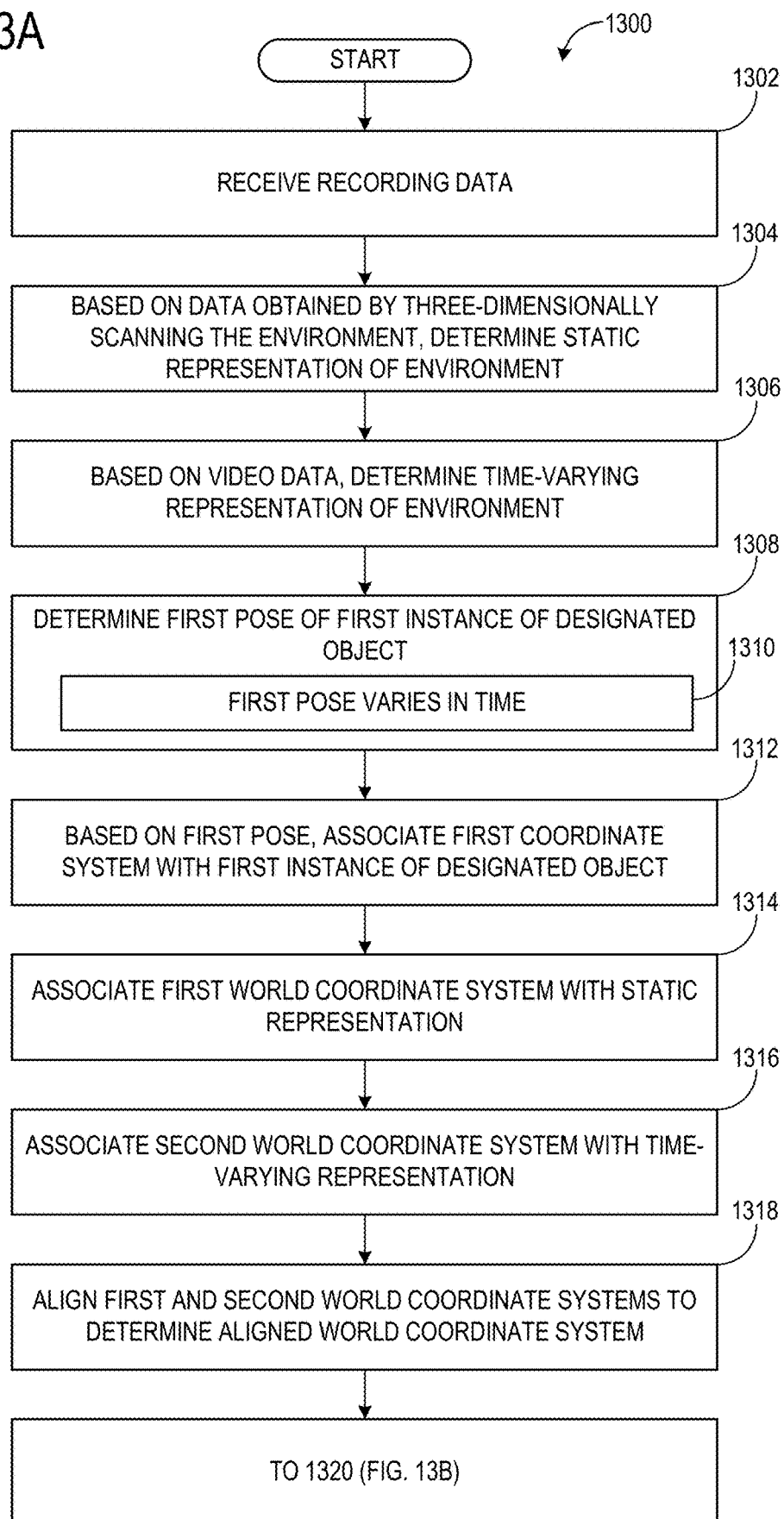
FIGS. 13A-13B show a flowchart illustrating a method of processing recording data including recorded hand motion.
Figure 13B:
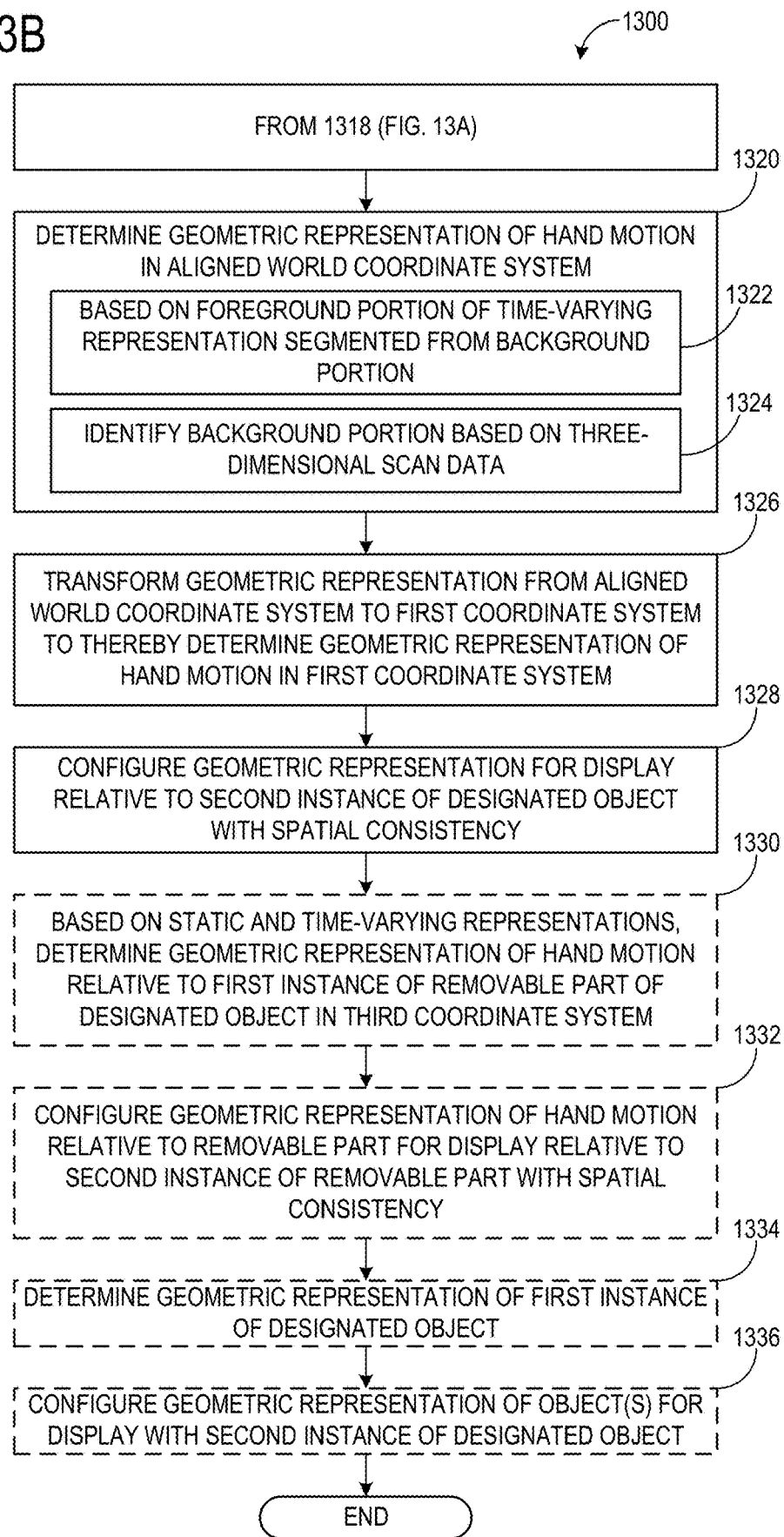

FIGS. 13A-13B show a flowchart illustrating a method 1300 of processing recording data including recorded hand motion. Method 1300 may represent the second phase of the three-phase pipeline mentioned above in which hand motion recorded in one context is displayed in another context. Reference to the example depicted in FIG. 6 is made throughout the description of method 1300. As such, method 1300 may be at least partially implemented on HMD device 604 and/or computing device 606.

At 1302, method 1300 includes receiving recording data obtained in the course of recording a demonstration in an environment. The recording data (e.g., recording data 602) may be received from HMD device 604, for example. The recorded data may include one or more of scan data (e.g., scan data 610) obtained from three-dimensionally scanning the environment, video data (e.g., video data 612) obtained from recording the demonstration, object data (e.g., object data 620) corresponding to a designated object instance relating to the recorded hand motion and/or a removable part of the object instance, and pose data (e.g., pose data 621) indicating a sequence of poses of an HMD device, for examples in which the recording data is received from the HMD device.

At 1304, method 1300 includes, based on the scan data obtained by three-dimensionally scanning the environment, determining a static representation of the environment. Representation engine 624 may be used to determine the static representation, for example. The static representation may include a three-dimensional point cloud, mesh, or any other suitable representation of the environment.

At 1306, method 1300 includes, based on the video data, determining a time-varying representation of the environment. The time-varying representation may be determined via representation engine 624 based on fused image data, for example. In some examples, the time-varying representation comprises a sequence of frames each consisting of a three-dimensional point cloud with per-point (e.g., RGB) color.

At 1308, method 1300 includes determining a first pose of a first instance of a designated object. As indicated at 1310, the first pose may be a time-varying pose that varies in time. The first pose may be determined via recognition engine 632, for example.

At 1312, method 1300 includes, based on the first pose, associating a first coordinate system with the first instance of the designated object. In some examples, the origin of the first coordinate system may be placed at an estimated centroid of the first instance, and the first coordinate system may be aligned to the first pose.

At 1314, method 1300 includes associating a first world coordinate system with the static representation. At 1316, method 1300 includes associating a second world coordinate system with the time-varying representation. At 1318, method 1300 includes aligning the first and second coordinate systems to determine an aligned world coordinate system. Such coordinate system association and alignment may be performed via coordinate engine 626, for example.

Turning to FIG. 13B, at 1320, method 1300 includes determining a geometric representation of hand motion, captured in the time-varying representation, in the aligned world coordinate system. At 1322, the geometric representation may be determined based on a foreground portion of the time-varying representation segmented from a background portion. In some examples, the foreground portion may include hand motion, moving object instances, and other dynamic object instances, and generally relevant object instances, whereas the background portion may include static and irrelevant data. At 1324, the background portion may be identified based on the three-dimensional scan data in the recorded data received at 1302. The geometric representation may be determined via representation engine 626 using segmentation engine 628, for example.

At 1326, method 1300 includes transforming the geometric representation of the hand motion from the aligned world coordinate system to the first coordinate system associated with the first instance of the designated object to thereby determine a geometric representation of the hand motion in the first coordinate system. Such transformation may be performed via coordinate engine 626, for example.

At 1328, method 1300 includes configuring the geometric representation of the hand motion in the first coordinate system for display relative to a second instance of the designated object in a spatially consistent manner. Configuring this geometric representation may include saving the geometric representation at a storage device that can be accessed and received at another HMD device for viewing the geometric representation in a location different than the location hand motion was recorded. Alternatively or additionally, configuring the geometric representation may include transmitting the geometric representation to the other HMD device. Here, spatial consistency may refer to the display of a geometric representation of hand motion recorded to a first object instance, relative to a second object instance with the changing pose of the hand motion that was recorded in relation to the first object instance. Spatial consistency may refer to the preservation of other spatial variables between first and second object instance sides. For example, the position, orientation, and scale of the recorded hand motion relative to the first object instance may be assigned to the position, orientation, and scale of the geometric representation, such that the geometric representation is displayed relative to the second object instance with those spatial variables.

At 1330, method 1300 optionally includes, based on the static and time-varying representations of the environment, determining a geometric representation of hand motion in the recorded data relative to a first instance of a removable part of the designated object, relative to a third coordinate system associated with the removable part. At 1332, method 1300 optionally includes configuring the geometric representation of hand motion, relative to the first instance of the removable part, for display relative to a second instance of the removable part with spatial consistency.

At 1334, method 1300 optionally includes determining a geometric representation of the first instance of the designated object. The geometric representation of the first instance of the designated object may be determined via representation engine 624, for example. Such representation alternatively or additionally may include a representation of a removable or articulated part of the first instance. At 1336, method 1300 optionally includes configuring the geometric representation of the first instance of the designated object for display with the second instance of the designated object.

Figure 14:
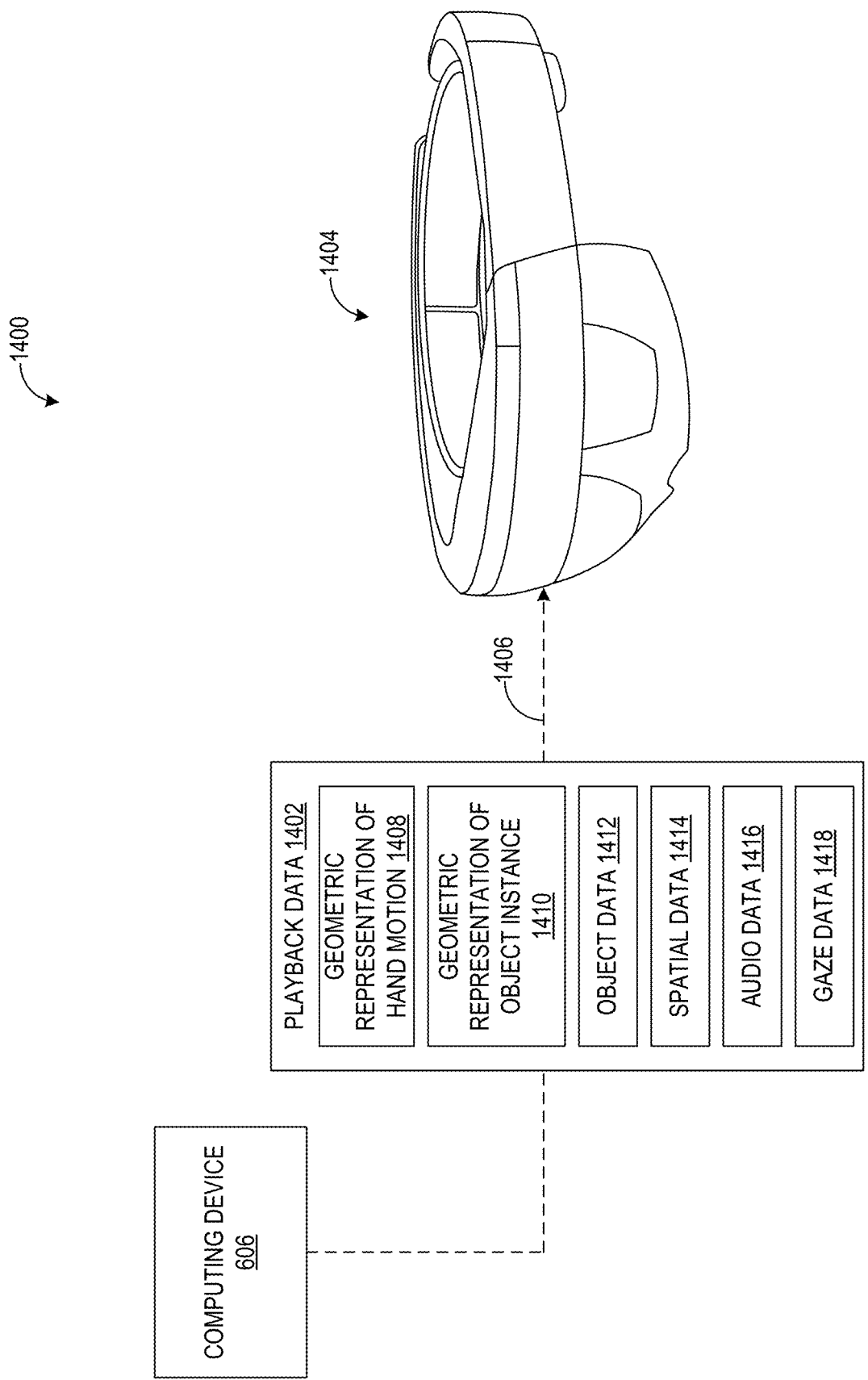
FIG. 14 schematically shows an example system in which playback data is transmitted to an HMD device.

FIG. 14 schematically shows an example system 1400 in which playback data 1402, produced by HMD device 604 in processing recorded data 602, is transmitted to an HMD device 1404 for playback. In particular, HMD device 1404 may play back representations of hand motion and/or object instances encoded in processed data 1402. HMD device 1404 may be viewer HMD device 204 or HMD device 300, as examples. HMD device 1404 and computing device 606 are communicatively coupled via a communication link 1406, which may assume any suitable wired or wireless, and direct or indirect form. Further, playback data 1402 may be transmitted to HMD device 1404 in any suitable manner—as examples, the playback data may be downloaded as a whole or streamed to the HMD device.

Playback data 1402 may include a geometric representation of recorded hand motion 1408. Geometric representation 1408 may include a three-dimensional point cloud or mesh, or in other examples a 2.5D representation. For examples in which the pose of hand motion varies in time, geometric representation 1408 may include be a time-varying geometric representation comprising a sequence of poses. Playback data 1402 may include a geometric representation of an object instance 1410, which may assume 3D or 2.5D forms. Geometric representation 1410 may represent an instance of a designated object, a removable part of the designated object, an articulated part of the designated object, or any other suitable aspect of the designated object. Further, in some examples, geometric representation 1410 may be formed by scanning an object as described above. In other examples, geometric representation 1410 may include a virtual model of an object instance created without scanning the object instance (e.g., by creating the virtual model via modeling software).

Further, playback data 1402 may include object data 1412, which may comprise an identity, object type/class, and/or output from a recognizer regarding the object instance that the recorded hand motion was performed in relation to. HMD device 1404 may utilize object data 1412 to identify that a second object instance in the surrounding physical space of the HMD device corresponds to the object instance that the recorded hand motion was performed in relation to, and thus that geometric representation 1408 of the recorded hand motion should be displayed in relation to the second instance. Generally, object data 1412 may include any suitable data to facilitate this identification.

To achieve spatial consistency between geometric representation 1408 relative to the second object instance and the recorded hand motion relative to the first object instance, playback data 1402 may include spatial data 1414 encoding one or more of a position, orientation, and scale of the geometric representation. Geometric representation 1408 may be displayed with these attributes relative to the second object instance.

Further, playback data 1402 may include audio data 1416, which may include narration spoken by a user that recorded the playback data, where the narration may be played back by HMD device 1404. Playback data 1402 may include gaze data 1418 of the user, which may be displayed via a display of HMD device 1404.

In other implementations, a non-HMD device may be used to present playback data 1402. For example, a non-HMD device including an at least partially transparent display may enable the viewing of representations of object instances and/or hand motion, along with a view of the surrounding physical space. As another example, a non-transparent display (e.g., mobile device display such as that of a smartphone or tablet, television, monitor) may present representations of object instances and/or hand motion, potentially along with image data capturing the physical space surrounding the display or the environment in which the hand motion was recorded. In yet another example, an HMD device may present representations of object instances and/or hand motion via a substantially opaque display. Such an HMD device may present imagery corresponding to a physical space via passthrough stereo video, for example.

FIG. 15 shows a flowchart illustrating a method 1500 of outputting a geometric representation of hand motion relative to a second instance of a designated object. The geometric representation may have been recorded relative to a first instance of the designated object. Method 1500 may be performed by HMD device 1404 and/or HMD device 300, as examples. The computing device on which method 1500 is performed may implement one or more of the engines described above with reference to FIG. 6.

At 1502, method 1500 includes, at an HMD device, receiving a geometric representation of motion of a hand, the geometric representation having a time-varying pose determined relative to a first pose of a first instance of a designated object in a first coordinate system. At 1504, method 1500 optionally includes receiving a geometric representation of motion of the hand determined relative to a first instance of a removable part of the first instance of the designated object in a third coordinate system. At 1506, method 1500 optionally includes receiving a geometric representation of the first instance of the removable part.

At 1508, method 1500 includes receiving image data obtained by scanning an environment occupied by the HMD device and by a second instance of the designated object. The HMD device may collect various forms of image data (e.g., RGB+D) and construct a three-dimensional point cloud or mesh of the environment, as examples. At 1510, method 1500 includes, based on the image data, determining a second pose of the second instance of the designated object. To this end, the HMD device may implement recognition engine 632, for example. The second pose may include a 6 DOF pose of the second object instance, in some examples. At 1512, the second pose may be time-varying in some examples.

At 1514, method 1500 includes associating a second coordinate system with the second instance of the designated object based on the second pose. To this end, the HMD device may implement coordinate engine 626, for example. At 1516, method 1500 includes outputting, via a display of the HMD device, the geometric representation of hand motion relative to the second instance of the designated object with a time-varying pose relative to the second pose that is spatially consistent with the time-varying pose relative to the first pose. Here, the geometric representation of hand motion may be rendered with respect to the second object instances with specific 6D poses, such that the relative pose between the hand motion and second object instance substantially matches what the relative pose had been between the hand and the first object instance that the hand was recorded in relation to.

At 1518, method 1500 optionally includes outputting, via the display, the geometric representation of the motion of the hand determined relative to the first instance of the removable part relative to a second instance of the removable part in a fourth coordinate system. At 1520, method 1500 optionally includes outputting, via the display, a geometric representation of the first instance of the removable part for viewing with the second instance of the removable part. In other implementations, however, a non-HMD device (e.g., mobile device display, television, monitor) may be used to present representations of object instances and/or hand motion, potentially along with a view of a physical space.

Modifications to the disclosed examples are possible, as are modifications to the contexts in which the disclosed examples are practiced. For example, motion of both of a user's hands may be recorded and represented for viewing in another location. In such examples, motion of both hands may be recorded in relation to a common object, or to objects respectively manipulated by the left and right hands. For example, a demonstration may be recorded and represented for later playback in which an object is held in one hand, and another object (e.g., in a fixed position) is manipulated by the other hand. Where two objects are respectively relevant to left and right hands, representations of both objects may be determined and displayed in another location.

Further, aspects of the disclosed examples may interface with other tools for authoring demonstrations and data produced by such tools. For example, aspects of the processing phase described above in which a recorded demonstration is processed (e.g., labeled, segmented, represented, recognized) for later playback may be carried out using other tools and provided as input to the processing phase. As a particular example with reference to FIG. 6, object instance labels (e.g., identities) and user annotations created via other tools, and thus not included in recorded data 602, may be provided as input to editor application 634. Such data may be determined via a device other than HMD device 604, for example.

Still further, the disclosed examples are applicable to the annotation of object instances, in addition to the recording of hand motion relative to object instances. For example, user input annotating an object instance in one location, where annotations may include hand gestures, gaze patterns, and/or audio narration, may be recorded and represented for playback in another location. In yet other examples, the disclosed examples are applicable to recording other types of motion (e.g., object motion as described above) in addition to hand motion, including motion of other body parts, motion of users external to the device on which the motion is recorded, etc.

In examples described above, a representation of hand motion may be determined in the coordinate system of an object in an environment. The object coordinate system may be determined based on the pose of the object, with the pose being estimated based on image data capturing the object. Similarly, image data may be used to determine the representation of hand motion—a static representation of the environment (generated by three-dimensionally imaging the environment) and a time-varying representation of the environment (generated from video data capturing hand motion in the environment) may be compared to determine a varying foreground portion of the time-varying representation that is segmented from a substantially fixed background portion to thereby produce the representation of hand motion. However, other techniques may enable the representation of hand motion with increased accuracy, reduced complexity, and in manners beyond display of the representation.

In view of the above, examples are disclosed that employ a parametric approach to representing hand motion. This parametric approach differs from the non-parametric, image-based approaches described above in several ways. For example, in the parametric approach a representation of hand motion may be determined in the coordinate system of a virtual model representing an object that the hand motion is performed in relation to, rather than in the coordinate system of the object itself as estimated from image data. As the virtual model may be encoded by a computational data structure, its coordinate system may be known rather than estimated (or at least to a higher degree of precision). As such, aligning the representation of hand motion to the virtual model may be more accurate than aligning the representation to the estimated coordinate system of the object—both for the recording and playback of the hand motion, as the virtual model may be aligned to different instances of the object (e.g., in different environments).

The parametric approach may further differ in its use of a parametric representation of hand motion rather than a geometric representation (e.g., mesh, point cloud). The parametric representation may be determined via a hand tracking engine, and may encode the respective articulation of one or more joints of a human hand. In contrast, the geometric representation is determined by segmenting different portions of a time-varying representation of an environment as described above. As such, the computational expense of segmentation, as well as other associated steps in the non-parametric approach including the construction of static and time-varying environmental representations, coordinate association, coordinate alignment, and other image processing, may be saved using the parametric approach. The parametric representation may also occupy less space in storage/memory compared to the geometric representation. Further, as described below, the parametric approach may enable the transfer of a parametric representation of hand motion to the manipulator of a robotic device, thereby enabling the robotic device to mimic or model hand motions. Specifically, as described below, the use of parameters enables easy mapping of hand motion to how mechanical robotic structures move. This transfer may facilitate an additional class of use cases and scenarios, with increased accuracy and reduced complexity relative to observation-based approaches to training robotic devices.

Figure 16A:
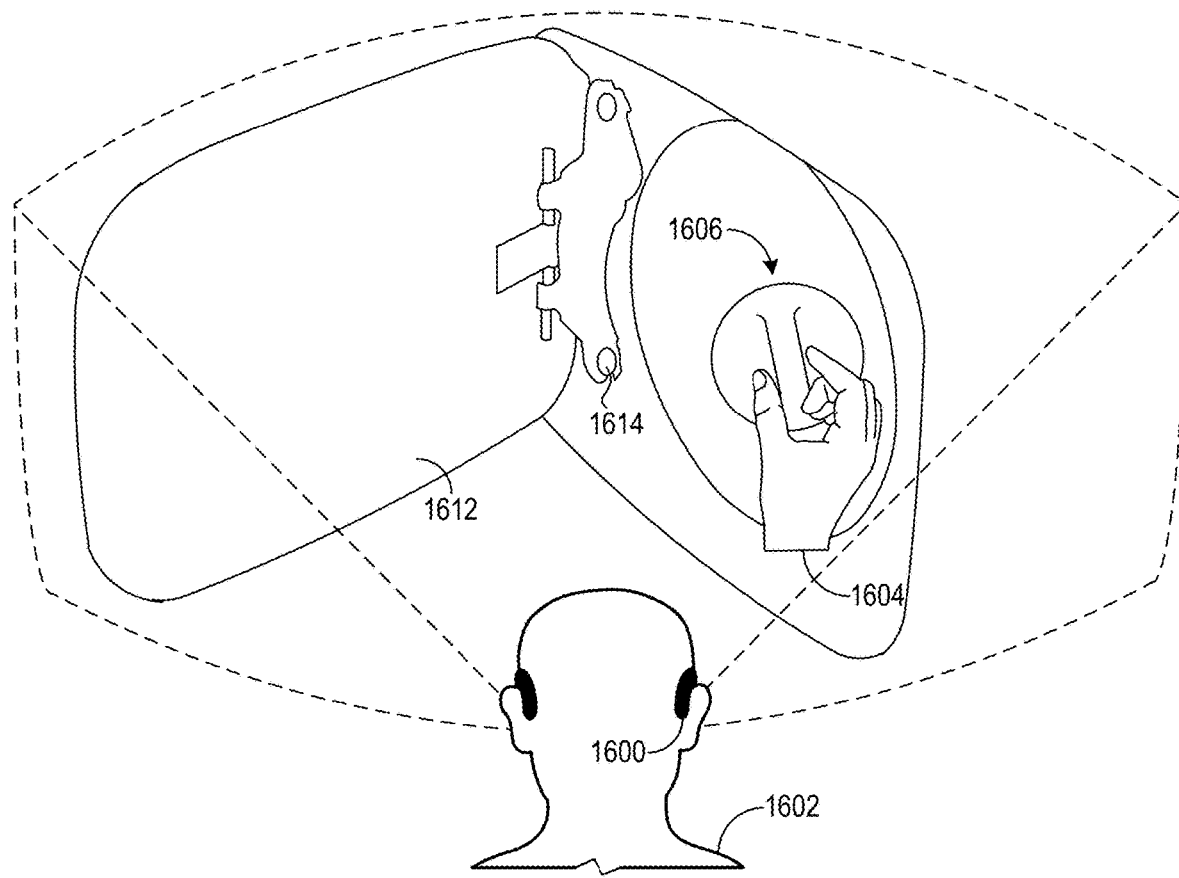
FIGS. 16A-16C illustrate an example process of determining a representation of hand motion.
Figure 16B:
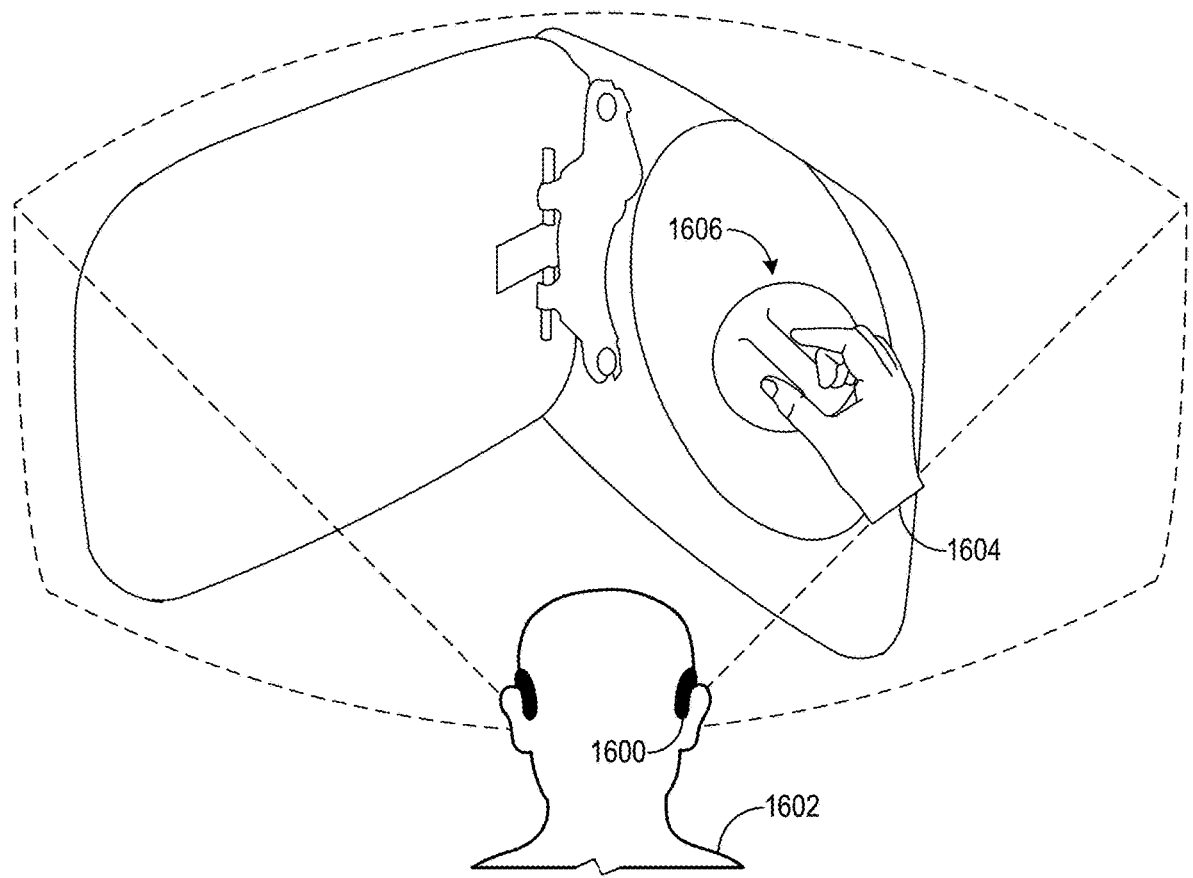
Figure 16C:
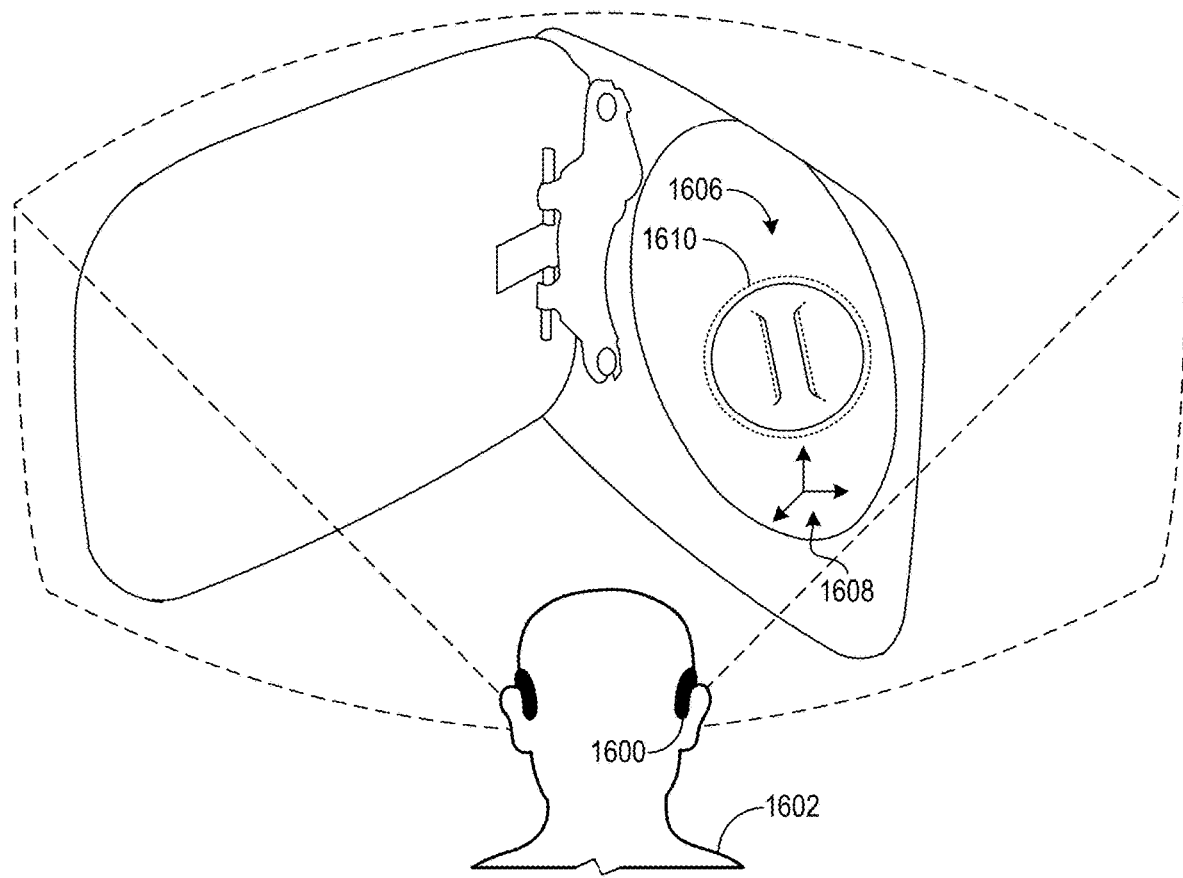

FIGS. 16A-C illustrate an example process of recording hand motion in accordance with the parametric approach introduced above. Via an HMD device 1600, a user 1602 records motion of a hand 1604 of the user performed in the opening of a fuel cap 1606 of a vehicle—e.g., as part of a video tutorial demonstrating how to refuel a vehicle. The recording captures the unscrewing of fuel cap 1606, with FIG. 16A illustrating the fuel cap and hand 1604 at an initial orientation at the start of the unscrewing, and FIG. 16B illustrating the fuel cap and hand at a subsequent orientation with the fuel cap partially unscrewed. Any suitable device other than an HMD device may be used to record hand motion, however.

The motion of hand 1604—including its rotation illustrated between FIGS. 16A-16B—is recorded in relation to a virtual model 1608, schematically shown in FIGS. 16C, that represents fuel cap 1606. HMD device 1600 aligns the pose of virtual model 1608 to the pose of fuel cap 1606, such that the three-dimensional position and orientation (e.g., 6 DOF pose) of the virtual model are respectively aligned with the three-dimensional position and orientation (e.g., 6 DOF pose) of fuel cap 1606. A representation of the recorded motion of hand 1604—referred to herein as a "recorded representation"—may then be determined in a coordinate system 1610 associated with virtual model 1608. With virtual model 1608 aligned to fuel cap 1606, and the representation placed in the coordinate system of the virtual model, the representation is accordingly aligned to the pose of the fuel cap. Placing the representation in this coordinate system also enables the representation to be transferred to other devices (which, in some examples may modify the representation or determine another representation based on the received representation) and accurately displayed in relation to other instances of a fuel cap. Thus, the representation and fuel cap 1606 (e.g., through its own representation via a virtual model described below) may be used to depict hand motion in the appropriate spatial context with respect to the fuel cap. Other potential portions of the recording not illustrated similarly may be represented—for example, articulation of an articulable fuel door 1612 may be represented by an articulating virtual model, and removal of a removable screw 1614 may also be represented by a virtual model. In other examples, virtual model 1608 may include such articulating and/or removable portions.

Figure 17:
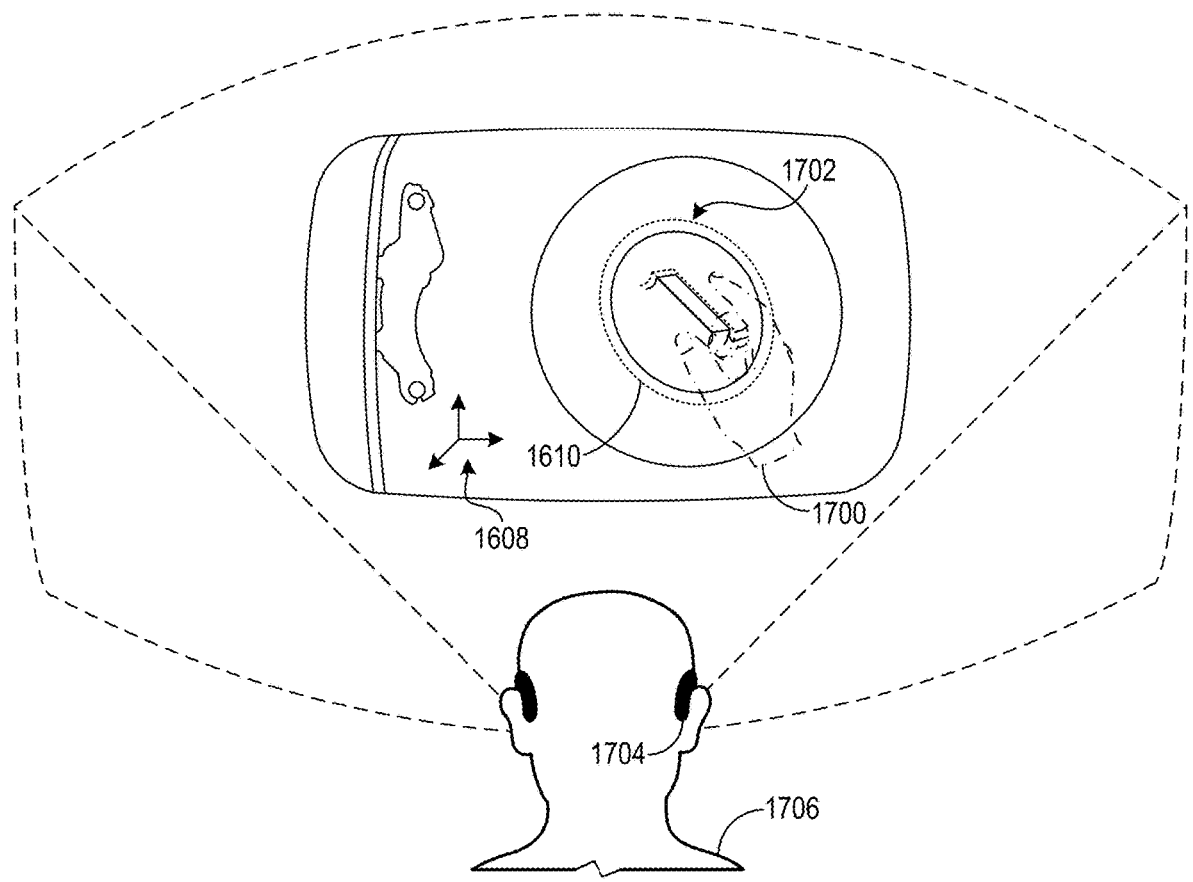
FIG. 17 illustrates an example of displaying a parametric representation of the hand motion illustrated in FIGS. 16A-16C.

FIG. 17 illustrates one such example of the display of a representation 1700 of motion of hand 1604 relative to a fuel cap 1702. Representation 1700 is output based on the recorded representation of the motion of hand 1604 determined via HMD device 1600—for example, representation 1700 may be the recorded representation, or may be determined based on the recorded representation (e.g., modified relative to the recorded representation), as described in further detail below. Fuel cap 1702 may be the same model as, or a model similar to, fuel cap 1606, or both may generally be a similar type of object. As such, fuel cap 1606 is referred to as a "first instance" of a fuel cap, and fuel cap 1702 is referred to as a "second instance" of the fuel cap. Representation 1700 is displayed via an HMD device 1704, which may occupy a different environment than that occupied by HMD device 1600. Representation 1700, relative to fuel cap 1702, is spatially consistent with the recorded representation of the motion of hand 1604 relative to fuel cap 1606, with respect to the instant of time depicted in FIG. 16A. In the depicted example, this spatial consistency is of the form that the three-dimensional position (e.g., x/y/z), three-dimensional orientation (e.g., yaw/pitch/roll), and scale of representation 1700 relative to fuel cap 1702 are substantially and respectively equal to the three-dimensional position, three-dimensional orientation, and scale of the recorded representation of hand 1604 relative to fuel cap 1606 (and in some examples substantially equal to the three-dimensional position, three-dimensional orientation, and scale of the hand itself, respectively). A user 1706 of HMD device 1704 perceives a different portion of hand 1604 (via representation 1700), however, due to the differing view perspective from that of user 1602 who recorded motion of their hand.

To achieve spatial consistency between representation 1700 and the recorded representation of the motion of hand 1604, HMD device 1704 aligns the pose of virtual model 1610 to the pose of fuel cap 1702. Accordingly, coordinate system 1608 is accurately placed within the scene observed by user 1706 such that representation 1700—determined in this coordinate system—is accurately rendered in relation to fuel cap 1702 in spatial consistency with the recorded representation of the motion of hand 1604 in relation to fuel cap 1606. Such alignment may be maintained as fuel cap 1702 is rotated (and potentially translated—e.g., as a result of being removed from a surrounding fuel door). Thus, the determined pose of an object may encompass changes to the object's pose as it undergoes rotation and/or translation (e.g., encoded as a time-varying sequence of poses). It will be understood, however, that in other examples different virtual models may be aligned to different object instances—for example, where the instances differ (e.g., due to differing model, wear and tear).

In the parametric approach to representing hand motion illustrated by this example, objects that hand motion is recorded in relation to are parameterized by virtual models that represent those objects. For many objects, corresponding virtual models may be readily available (e.g., accessible from a remote source via a network connection), allowing their availability to be leveraged for the representation of hand motion. Virtual models may take the form of three-dimensional computer-aided design (CAD) models, for example, or any other suitable form. Further, in some examples virtual models may be used to identify and/or recognize the objects the models represent, as described in further detail below.

Hand motion is also parameterized in the parametric approach. For example, representation 1700 of hand motion may be a parametric representation that encodes the articulation of one or more joints of hand 1604. Representation 1700 is determined based on the recorded representation of the hand motion taken by HMD device 1600 as mentioned above. In some examples, the recorded representation itself may be a parametric representation of the hand motion, in which case the parametric representation displayed on HMD device 1704 may be the parametric representation determined by HMD device 1600. In other examples, parametric representation 1700 may be determined based on the recorded representation but modified relative to the recorded representation, for example with respect to its geometry, pose, animation, or any other suitable aspect.

As a particular example, one parametric form of a parametric representation of motion of a hand may include a 28-dimensional vector that encodes the articulation of each hand joint, thereby enabling the articulation of the fingers and joints of the hand, as well as the overall pose (e.g., 6 DOF pose) of the hand, to be reproduced. A parametric representation of hand motion may include a time-varying sequence of such 28D vectors that collectively encode the hand motion as it changes over time. As described above, a parametric representation of hand motion may be determined in the coordinate system (e.g., coordinate system 1608) of a virtual model, enabling its transfer (whether with or without modification) between different object instances and environments. The parametric representation may further enable the computational cost and complexity associated with segmenting image data to determine a geometric representation of hand motion described above to be avoided.

As alluded to above, parametric representations of hand motion may enable recorded hand motion to be used in manners other than playback. FIG. 18 illustrates one such example in which a manipulator 1800 of a robotic device 1802 is controlled according to a parametric representation of motion of a hand 1804. The parametric representation, which also may be considered a recorded representation, is determined relative to a virtual model 1806 aligned to a first instance 1808 of a screw, in a coordinate system of the virtual model. The parametric representation is then transferred (e.g., via a network connection) to robotic device 1802, which upon identifying a second instance 1810 of a screw, aligns virtual model 1806 to the second instance based at least in part on image data collected by an image sensor 1812. Based on the parametric representation, a corresponding sequence of actions to be performed by manipulator 1800 is then determined. For example, for each action in the sequence of actions, one or more corresponding commands may be generated and issued to manipulator 1800 to thereby cause the manipulator to perform that action. FIG. 18 illustrates a particular action in the form of a pinching gesture carried out by manipulator 1800 in accordance with the pinching of first instance 1808 of the screw by hand 1804. Other gestures and actions carried out by hand 1804 may be substantially mimicked by manipulator 1800 to perform the hand motion recorded by HMD device 1801.

FIG. 18 illustrates an example in which the number of fingers of manipulator 1800 differs from the number of fingers of hand 1804 whose motion informs that of the manipulator. In such examples, predetermined transformation(s) can be used to convert the pose and articulation of hand 1804 encoded in its parametric representation to a corresponding pose and articulation of manipulator 1800 and other manipulators with other numbers of fingers or types of articulating appendages such as hands, arms, and grippers. Thus, "manipulator" as used herein refers to any suitable type of robotic appendage. Any suitable methods may be employed to determine such transformation(s), including but not limited to parameter-to-parameter transfer and deep learning. As additional examples, a neural network or support vector machine may be trained to classify human grasps and manipulations in a (e.g., fixed) vocabulary of actions with associated parameter(s) (e.g., width of grasp). Further engineering may be performed to convert this vocabulary into a parameterized set of actions for a robot manipulator. In some examples, a synthetic model of human hands may be used. Alternatively or additionally, a mapping between human hand and robot manipulator actions may be determined using image data capturing motion of real human hands. Potentially in addition, a (e.g., teleoperated) robot manipulator may be controlled in accordance with the imaged human hand motion to build the mapping. The translation of human hand motion to motion of a robot manipulator in this manner may provide a simpler, more accurate, and less computationally expensive method of controlling robot manipulators in accordance with hand motion relative to approaches that employ observational learning (e.g., of image data) to do so, and potentially with reduced human engineering.

In some examples, error in the control of manipulator 1800, and/or in the optical sensing of second instance 1810 of the screw via image sensor 1812, may result in a mismatch between the intended positioning of the manipulator (e.g., where the manipulator is to be positioned based on the location of hand 1804) and the actual positioning of the manipulator. As such, robotic device 1802 may employ a technique referred to as "visual servoing" in which image data from image sensor 1812 is used as a feedback signal in the control of manipulator 1800 to thereby update and correct positioning error. In particular, such image data may be used to continuously estimate the pose of second instance 1810 of the screw in real time, and, where error is detected, update commands issued to manipulator 1800 to thereby align the manipulator with the second instance of the screw.

Figure 19:
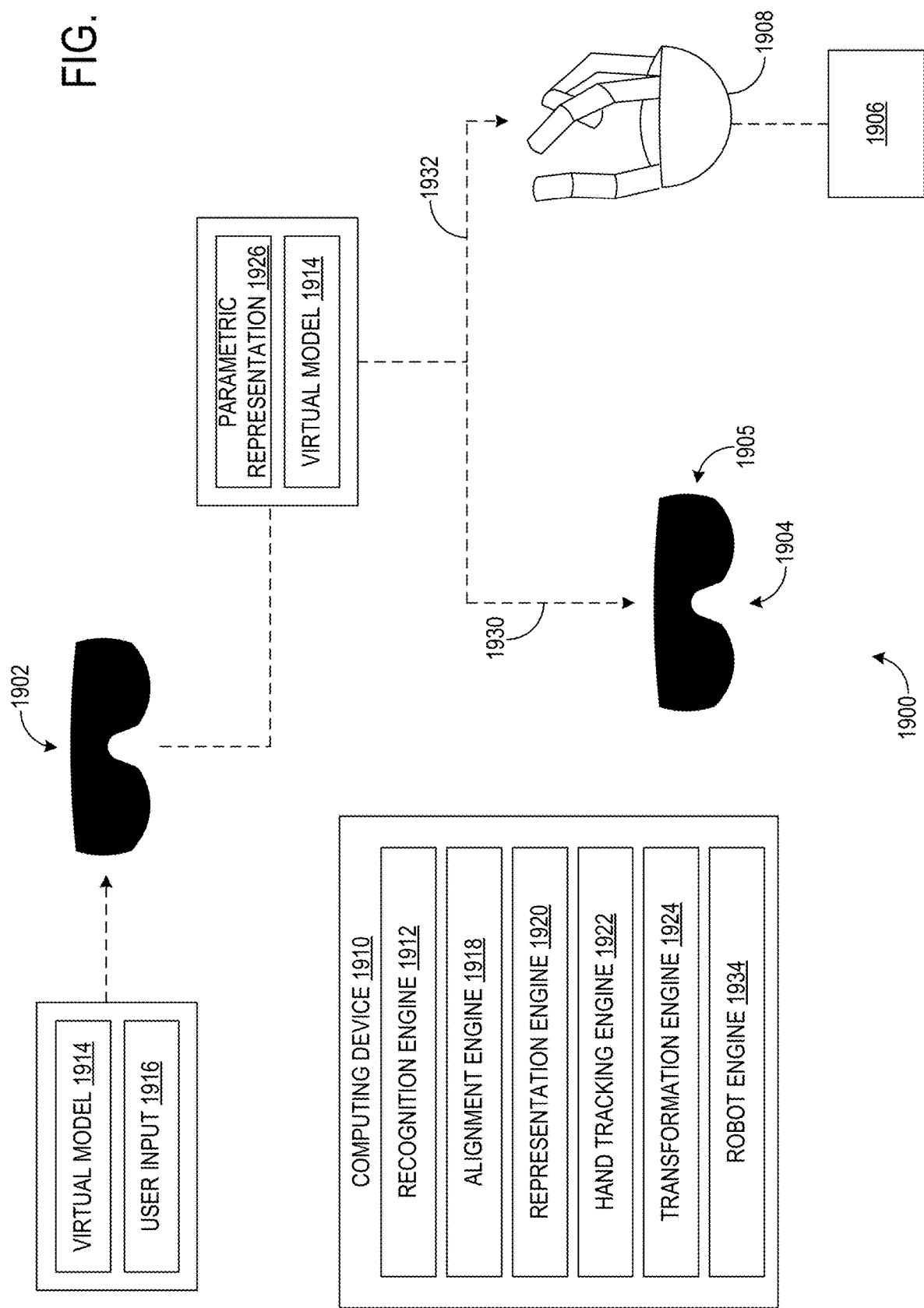
FIG. 19 shows an example system for sharing representations of hand motion.

FIG. 19 shows an example system 1900 for sharing representations (e.g., recorded and/or parametric representations) of hand motion recorded by an HMD device 1902 with another HMD device 1904 and/or a robotic device 1906. HMD device 1904 may playback the representation of hand motion via a display 1905, while robotic device 1906 may generate commands to control a manipulator 1908 in accordance with the hand motion. System 1900 also includes a computing device 1910, aspects of which may be implemented by the HMD devices and/or robotic devices described herein to implement the recording and sharing of representations of hand motion.

Computing device 1910 includes a recognition engine 1912 configured to recognize an instance of an object in an environment. Recognition engine 1912 may recognize the instance based on image data (e.g., RGB, greyscale, and/or depth data), for example collected by HMD device 1902. In some examples, recognition engine 1912 may recognize the instance based on a virtual model 1914 representing the instance, whose reception by HMD device 1902 is schematically shown. In such examples, a pre-recognition process may be performed in which image data indicating or suggesting the presence of the instance is used to obtain virtual model 1914, which is then used to confirm the presence of the instance. Other data may be used alternatively or in addition to image data to obtain virtual model 1914, such as user input 1916 (e.g., voice input, hand gestures, gaze patterns) identifying or suggesting the presence of the instance. In other examples, virtual model 1914 may be obtained (e.g., from a remote source via a network connection, or stored locally on HMD device 1902) in response to identifying the instance. As described above, virtual model 1914 may assume any suitable form, including but not limited to that of a mesh, point cloud, three-dimensional CAD model, etc. In some examples, virtual model 1914 may include an articulable part (representing an articulable part of the instance) and/or a removable part (representing a removable part of the instance), while in other examples, separate virtual models may be used for such parts. Recognition engine 1912 may implement aspects of recognition engine 632 (FIG. 6), in some examples.

Computing device 1910 further includes an alignment engine 1918 configured to align virtual model 1914 to the instance. To this end, alignment engine 1918 may determine the pose of the instance, and align the pose of virtual model 1914 to the pose of the instance. This may enable knowledge of the location of various portions/parts of the instance. Virtual model 1914 may have an associated coordinate system, where alignment of the virtual model with the instance properly places the coordinate system in the relevant environmental scene. Alignment engine 1918 may maintain the alignment of virtual model 1914 and its coordinate system to the instance as the instance undergoes motion—for example, in the event of an articulable part of the instance moving, or a removable part—or the instance itself—being removed from attachment to another part.

Computing device 1910 further includes a representation engine 1920 configured to determine a parametric representation of hand motion. As such, representation engine 1920 may receive image data (e.g., video data) recording hand motion, and determine the parametric representation of the recorded hand motion. Alternatively or additionally, representation engine 1920 may receive a recorded representation of hand motion (which itself may be in parametric form), and determine the parametric representation based on the recorded representation. As described above, the recorded representation may be used as the parametric representation (e.g., where the recorded representation is in parametric form), in which case determination of a parametric representation separate from the recorded representation may be foregone. In other examples, the parametric representation may be determined based on the recorded representation but may differ from the recorded representation—e.g., with respect to geometry, pose, articulation, animation/variance in time, or any other suitable aspect. In yet other examples, representation engine 1920 may convert a non-parametric representation (e.g., a geometric representation of hand motion) to the parametric representation.

The parametric representation may be determined relative to virtual model 1914 representing the instance that the hand motion was performed in relation to—e.g., the parametric representation may be determined in the coordinate system of the virtual model. Then, virtual model 1914 may be aligned with another instance of the object (e.g., in another environment), such that its coordinate system is aligned with the other instance, enabling the parametric representation of hand motion (or another representation) to be displayed relative to the other instance in spatial consistency with how the hand motion was performed in relation to the initial instance.

The parametric representation may encode the articulation of one or more joints of a hand, and/or the overall pose of the hand. As such, representation engine 1920 may utilize a hand tracking engine 1922 to determine the parametric representation. As described above, the parametric representation may assume any suitable form, such as that of a 28D vector encoding the respective articulation of each joint of a human hand, and thus the overall pose of the hand. Further, the parametric representation may include a time-varying sequence of poses that each represent respective articulations of a plurality of hand joints.

In some examples, representation engine 1920/hand tracking engine 1922 may produce the parametric representation of hand motion in a head coordinate system associated with the head of a user of HMD device 1902. As such, computing device 1910 may utilize a transformation engine 1924 to transform the parametric representation from the head coordinate system to the coordinate system of virtual model 1914. The head coordinate system may be determined based on the head pose of the user, which in turn may be determined via an IMU implemented in HMD device 1902, image data collected by the HMD device, wireless sensing performed by the HMD device, or in any other suitable manner. The determination of the head pose/head coordinate system may enable the parametric representation to be accurately rendered with respect to an object instance as well as a viewer's perspective.

FIG. 19 illustrates an example in which a parametric representation 1926 of hand motion, recorded by HMD device 1902, is shared with HMD device 1904 via a network connection 1930. Parametric representation 1926 may be determined via computing device 1910, aspects of which may be implemented by HMD device 1902. As shown, parametric representation 1926 and virtual model 1914 are transmitted from HMD device 1902 to HMD device 1904. Collectively, parametric representation 1926 and virtual model 1914 may encode a sequence of representations of hand/joint poses and articulations, the location of such representations in the coordinate system of the virtual model, as well as the pose(s) of the virtual model (and potentially parts thereof). This data may be considered to parameterize the tasks performed in connection with the represented hand motion. Alternative or additional suitable data may be shared, however, including but not limited to user gaze patterns, voice data, hand gestures, and other forms of annotations. In other examples, HMD device 1902 may share a recorded representation (parametric or non-parametric) with HMD device 1904, where HMD device 1904 may determine a parametric representation based on the recorded representation, as described above.

FIG. 19 also depicts the sharing of parametric representation 1926 of hand motion with robotic device 1906 via a network connection 1932. As described above, a sequence of actions may be determined for performance by manipulator 1908 in accordance with parametric representation 1926, with one or more commands being generated for each action that cause the manipulator to perform that action. To this end, computing device 1910 further includes a robot engine 1934 configured to determine the sequence of actions and corresponding commands for manipulator 1908. Robotic device 1906 may implement aspects of computing device 1910, including robot engine 1934, for example. As described above, actions and commands for manipulator 1908 may be determined based on parametric representation 1926 in any suitable manner, such as via transformations computed via a support vector machine or neural network, and/or via a fixed vocabulary. Further, robot engine 1934 may be configured to perform visual servoing using feedback (e.g., from an image sensor such as image sensor 1812 of FIG. 18) to correct errors in the positioning of manipulator 1800 and update control commands issued to the manipulator that effect such correction.

Figure 20:
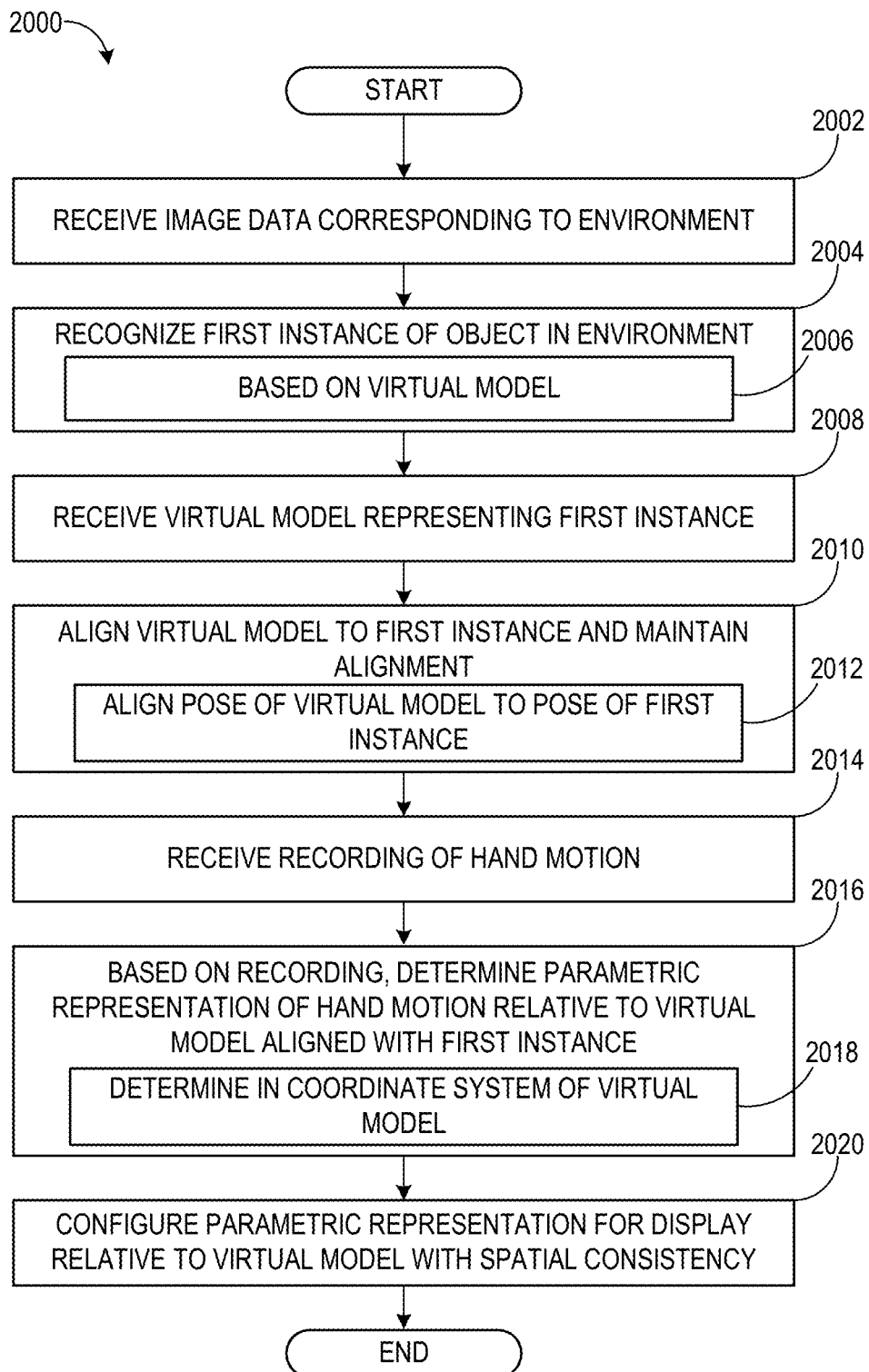
FIG. 20 shows a flowchart illustrating an example method of determining a parametric representation of hand motion.

FIG. 20 shows a flowchart illustrating a method 2000 of determining a parametric representation of hand motion. Method 2000 may be implemented by one or more the HMD devices described herein and/or computing device 1910, for example.

At 2002, method 2000 includes receiving image data corresponding to an environment. The image data may include RGB data, greyscale data, depth data, and/or any other suitable type of image data. At 2004, method 2000 includes recognizing a first instance of an object in the environment. In some examples, the first instance may be recognized based on a virtual model 2006 representing the first instance. In other examples, the virtual model may be received in response to recognizing the first instance.

At 2008, method 2000 includes receiving a virtual model representing the first instance of the object. At 2010, method 2000 includes aligning the virtual model to the first instance and maintaining such alignment (e.g., as the first instance undergoes motion). In some examples, aligning the virtual model may include aligning 2012 the pose of the virtual model to the pose of the first instance. The pose of the first instance may be recognized as part of recognizing the first instance at 2004, for example.

At 2014, method 2000 includes receiving a recording of hand motion. The recording may include video data capturing the hand motion, for example. At 2016, method 2000 includes, based on the recording, determining a parametric representation of hand motion relative to the virtual model aligned with the first instance of the object. The parametric representation may include a sequence of vectors representing respective articulations of a plurality of hand joints, for example. In some examples, the parametric representation may be determined in a coordinate system 2018 of the virtual model. At 2020, method 2000 includes configuring the parametric representation of hand motion for display relative to the virtual model as aligned to a second instance of the object, where the display is spatially consistent with the parametric representation of hand motion relative to the virtual model as aligned to the first instance of the object. For example, the three-dimensional position, three-dimensional orientation, and scale of the parametric representation relative to the second instance may be substantially equal to the three-dimensional position, three-dimensional orientation, and scale of the recorded hand relative to the first instance.

In other examples, a recorded representation of hand motion may be received a 2014, and the parametric representation may be determined at 2016 based on the recorded representation. The recorded representation may be a parametric representation, in which case determining the parametric representation at 2016 may include configuring the parametric representation received at 2014 for use with or without modification. In other examples, a non-parametric (e.g., geometric) representation may be received at 2014, and determining the parametric representation at 2016 may include converting the non-parametric representation to the parametric representation.

Figure 21:
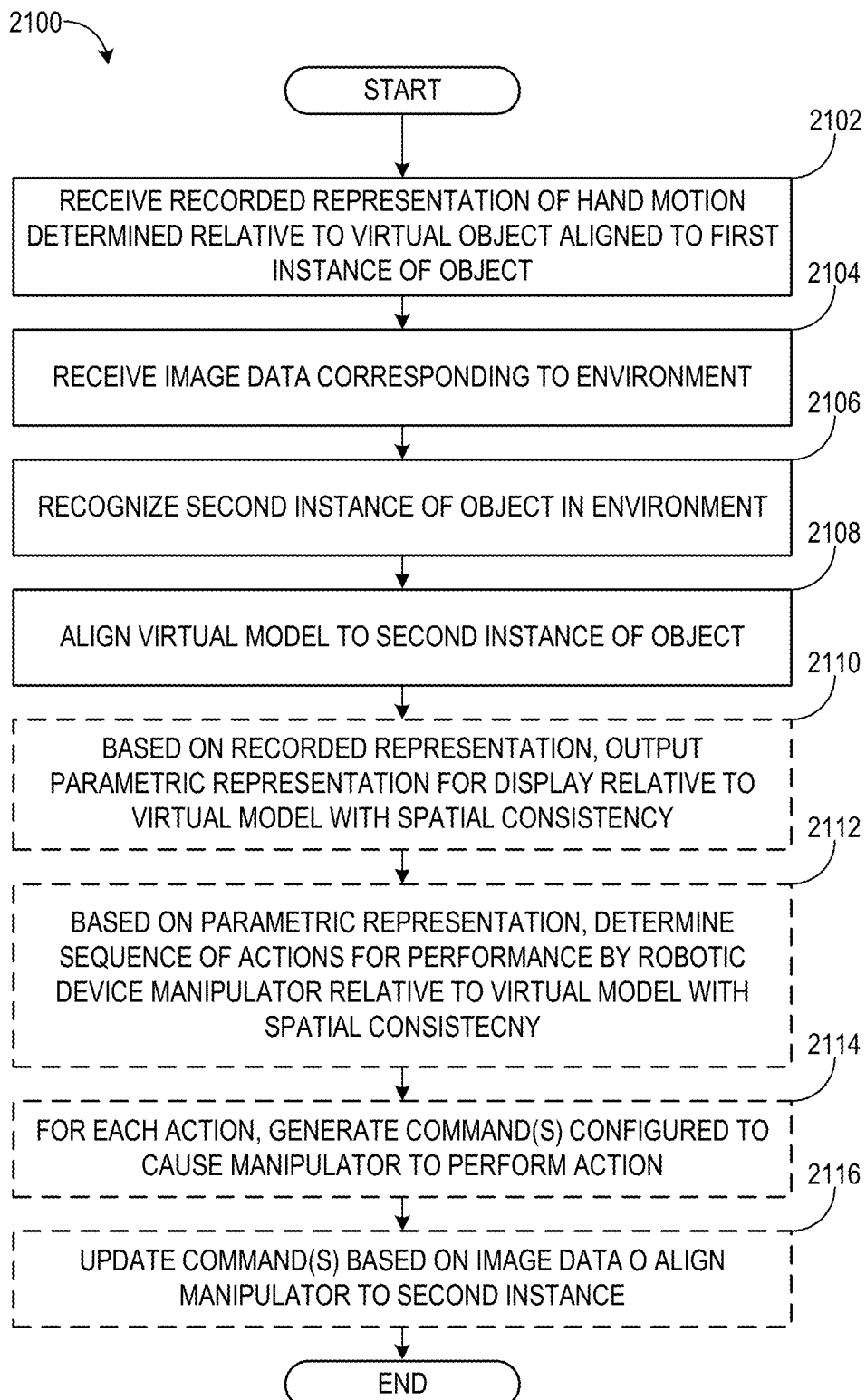
FIG. 21 shows a flowchart illustrating an example method of outputting a parametric representation of hand motion.

FIG. 21 shows a flowchart illustrating a method 2100 of outputting a parametric representation of hand motion. Method 2000 may be implemented by one or more the HMD devices described herein and/or computing device 1910, for example.

At 2102, method 2100 includes receiving a recorded representation of hand motion determined relative to a virtual model aligned to a first instance of an object. At 2104, method 2100 includes receiving image data corresponding to an environment. At 2106, method 2100 includes recognizing a second instance of the object in the environment. At 2108, method 2100 includes aligning the virtual model to the second instance of the object. At 2110, method 2100 optionally includes based on the recorded representation of hand motion, outputting a parametric representation of hand motion for display relative to the virtual model as aligned to the second instance of the object, such that the parametric representation of hand motion relative to the virtual model as aligned to the second instance of the object is spatially consistent with the recorded representation of hand motion relative to the virtual model as aligned to the first instance of the object. For example, the parametric representation may be output for display at an HMD device. As described above, outputting the parametric representation at 2110 may include outputting the recorded representation with or without modification, or may include determining the parametric representation based on the recorded representation (e.g., via method 2000).

At 2112, method 2100 optionally includes, based on the parametric representation of hand motion, determining a sequence of actions for performance, relative to the virtual model as aligned to the second instance of the object, by a manipulator of the robotic device, where the sequence of actions is spatially consistent with the parametric representation of hand motion relative to the virtual model as aligned to the first instance of the object. In such examples, method 2100 may include, for each action of the sequence of actions, generating one or more corresponding commands 2114 configured to cause the manipulator to perform the action. In such examples, method 2100 may include updating 2116 the one or more commands based on the image data to thereby align the manipulator to the second instance of the object.

In some embodiments, the methods and processes described herein may be tied to a computing system of one or more computing devices. In particular, such methods and processes may be implemented as a computer-application program or service, an application-programming interface (API), a library, and/or other computer-program product.

Figure 22:
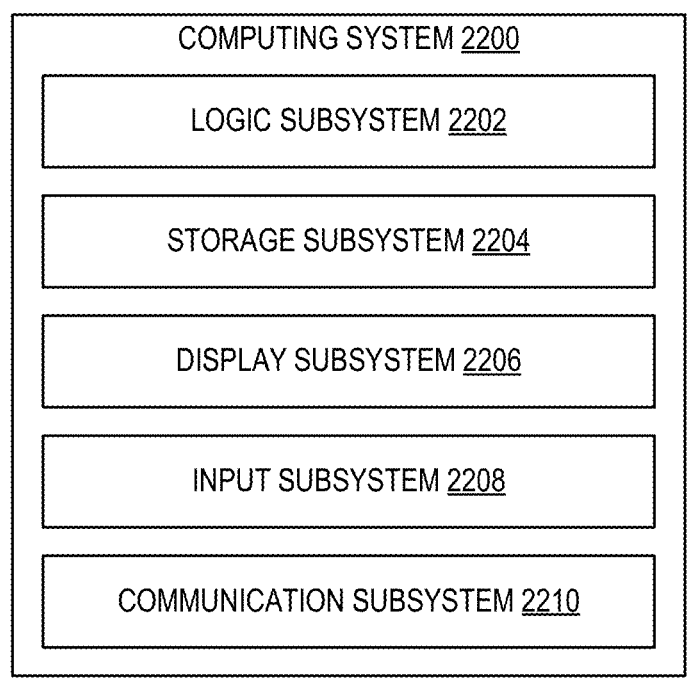
FIG. 22 shows a block diagram of an example computing system.

FIG. 22 schematically shows a non-limiting embodiment of a computing system 2200 that can enact one or more of the methods and processes described above. Computing system 2200 is shown in simplified form. Computing system 2200 may take the form of one or more personal computers, server computers, tablet computers, home-entertainment computers, network computing devices, gaming devices, mobile computing devices, mobile communication devices (e.g., smart phone), and/or other computing devices.

Computing system 2200 includes a logic subsystem 2202 and a storage subsystem 2204. Computing system 2200 may optionally include a display subsystem 2206, input subsystem 2208, communication subsystem 2210, and/or other components not shown in FIG. 22.

Logic subsystem 2202 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic machines configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 2204 includes one or more physical devices configured to hold instructions executable by the logic subsystem to implement the methods and processes described herein. When such methods and processes are implemented, the state of storage subsystem 2204 may be transformed—e.g., to hold different data.

Storage subsystem 2204 may include removable and/or built-in devices. Storage subsystem 2204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 2204 may include volatile, nonvolatile, dynamic, static, read/write, read-only, random-access, sequential-access, location-addressable, file-addressable, and/or content-addressable devices.

It will be appreciated that storage subsystem 2204 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 2202 and storage subsystem 2204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 2200 implemented to perform a particular function. In some cases, a module, program, or engine may be instantiated via logic subsystem 2202 executing instructions held by storage subsystem 2204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 2206 may be used to present a visual representation of data held by storage subsystem 2204. This visual representation may take the form of a graphical user interface (GUI). As the herein described methods and processes change the data held by the storage subsystem, and thus transform the state of the storage subsystem, the state of display subsystem 2206 may likewise be transformed to visually represent changes in the underlying data. Display subsystem 2206 may include one or more display devices utilizing virtually any type of technology. Such display devices may be combined with logic subsystem 2202 and/or storage subsystem 2204 in a shared enclosure, or such display devices may be peripheral display devices.

When included, input subsystem 2208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 2210 may be configured to communicatively couple computing system 2200 with one or more other computing devices. Communication subsystem 2210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 2200 to send and/or receive messages to and/or from other devices via a network such as the Internet.

Another example provides a computing device comprising a logic subsystem, and a storage subsystem comprising instructions executable by the logic subsystem to receive a recorded representation of hand motion determined relative to a virtual model aligned to a first instance of an object, receive image data corresponding to an environment, recognize a second instance of the object in the environment, align the virtual model to the second instance of the object, and based on the recorded representation of hand motion, output a parametric representation of hand motion for display relative to the virtual model as aligned to the second instance of the object, such that the parametric representation of hand motion relative to the virtual model as aligned to the second instance of the object is spatially consistent with the recorded representation of hand motion relative to the virtual model as aligned to the first instance of the object. In such an example, the second instance may be recognized based on the virtual model. In such an example, the instructions may be further executable to determine a pose of the second instance of the object. In such an example, the instructions executable to align the virtual model to the second instance of the object may be executable to align a pose of the virtual model to the pose of the second instance of the object. In such an example, the recorded representation of hand motion may be determined in a coordinate system of the virtual model. In such an example, the parametric representation of hand motion may be output for display on a head-mounted display device. In such an example, the parametric representation of hand motion alternatively or additionally may be output for display based on a head pose of a user of the head-mounted display device. In such an example, the instructions alternatively or additionally may be executable to maintain an alignment of the virtual model to the second instance of the object as the second instance of the object undergoes motion. In such an example, the motion may include motion of an articulable part of the second instance of the object. In such an example, the motion alternatively or additionally may include motion of a removable part of the second instance of the object. In such an example, the recorded representation of hand motion may include a time-varying sequence of poses that each represent respective articulations of a plurality of hand joints.

Another example provides a computing device comprising a logic subsystem, and a storage subsystem comprising instructions executable by the logic subsystem to receive image data corresponding to an environment, recognize a first instance of an object in the environment, receive a virtual model representing the first instance of the object, align the virtual model to the first instance of the object and maintain such alignment, receive a recording of hand motion, based on the recording, determine a parametric representation of hand motion relative to the virtual model as aligned with the first instance of the object, and configure the parametric representation of hand motion for display relative to the virtual model as aligned to a second instance of the object, such that the parametric representation of hand motion relative to the virtual model as aligned to the second instance of the object is spatially consistent with the parametric representation of hand motion relative to the virtual model as aligned to the first instance of the object. In such an example, the first instance of the object may be recognized based on the virtual model. In such an example, the computing device may further comprise instructions executable to determine a pose of the first instance of the object. In such an example, the instructions executable to align the virtual model to the first instance of the object may be executable to align a pose of the virtual model to the pose of the first instance of the object. In such an example, the parametric representation of hand motion may be determined in a coordinate system of the virtual model. In such an example, the computing device alternatively or additionally may comprise instructions executable to output the parametric representation of hand motion for display at another computing device.

Another example provides, at a robotic device, a method of controlling a robot manipulator, comprising receiving a parametric representation of hand motion determined relative to a virtual model aligned to a first instance of an object, receiving image data corresponding to an environment, recognizing a second instance of the object in the environment, aligning the virtual model to the second instance of the object, and based on the parametric representation of hand motion, determining a sequence of actions for performance, relative to the virtual model as aligned to the second instance of the object, by a manipulator of the robotic device, where the sequence of actions is spatially consistent with the parametric representation of hand motion relative to the virtual model as aligned to the first instance of the object. In such an example, the method may further comprise, for each action of the sequence of actions, generating one or more corresponding commands configured to cause the manipulator to perform the action. In such an example, the method may further comprise updating the one or more commands based on the image data to thereby align the manipulator to the second instance of the object.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a logic subsystem; and
   a storage subsystem comprising instructions executable by the logic subsystem to:
      receive a recorded representation of hand motion determined in a coordinate system of a virtual model aligned to a first object, the virtual model corresponding to the first object;
      receive image data corresponding to an environment;
      recognize a second object in the environment;
      align the virtual model to the second object; and
      based on the recorded representation of hand motion, output a parametric representation of hand motion for display in a coordinate system of the virtual model as aligned to the second object, such that the parametric representation of hand motion relative to the virtual model as aligned to the second object is spatially consistent with the recorded representation of hand motion relative to the virtual model as aligned to the first object, wherein the parametric representation includes a multi-dimensional vector, wherein each dimension of the multi-dimensional vector encodes an articulation of at least one of a plurality of hand joints.

2. The computing device of claim 1, wherein the second object is recognized based on the virtual model.

3. The computing device of claim 1, further comprising instructions executable to determine a pose of the second object.

4. The computing device of claim 3, wherein the instructions executable to align the virtual model to the second object are executable to align a pose of the virtual model to the pose of the second object.

5. The computing device of claim 1, wherein the recorded representation of hand motion is determined in the coordinate system of the virtual model.

6. The computing device of claim 1, wherein the parametric representation of hand motion is output for display on a head-mounted display device.

7. The computing device of claim 6, wherein the parametric representation of hand motion is output for display based on a head pose of a user of the head-mounted display device.

8. The computing device of claim 1, wherein the instructions are further executable to maintain an alignment of the virtual model to the second object as the second object undergoes motion.

9. The computing device of claim 8, wherein the motion includes motion of an articulable part of the second object.

10. The computing device of claim 8, wherein the motion includes motion of a removable part of the second object.

11. The computing system of claim 1, further comprising instructions executable to use the multi-dimensional vector to reproduce an overall pose of a hand.

12. A computing device, comprising:
    a logic subsystem; and
    a storage subsystem comprising instructions executable by the logic subsystem to:
       receive image data corresponding to an environment;
       recognize a first object in the environment;
       receive a virtual model representing the first object;
       align the virtual model to the first object and maintain such alignment;

receive a recording of hand motion;

based on the recording, determine a parametric representation of hand motion relative to the virtual model as aligned with the first object; and configure the parametric representation of hand motion for display in a coordinate system of the virtual model as aligned to a second object, such that the parametric representation of hand motion relative to the virtual model as aligned to the second object is spatially consistent with the parametric representation of hand motion relative to the virtual model as aligned to the first object, wherein the parametric representation includes a multi-dimensional vector, wherein each dimension of the multi-dimensional vector encodes an articulation of at least one of a plurality of hand joints.

13. The computing device of claim 12, wherein the first object is recognized based on the virtual model.

14. The computing device of claim 12, further comprising instructions executable to determine a pose of the first object.

15. The computing device of claim 14, wherein the instructions executable to align the virtual model to the first object are executable to align a pose of the virtual model to the pose of the first object.

16. The computing device of claim 12, wherein the parametric representation of hand motion is determined in the coordinate system of the virtual model.

17. The computing device of claim 12, further comprising instructions executable to output the parametric representation of hand motion for display at another computing device.

18. At a robotic device, a method of controlling a robot manipulator, comprising:

receiving a parametric representation of hand motion determined in a coordinate system of a virtual model aligned to a first object, the virtual model corresponding to the first object;

receiving image data corresponding to an environment;

recognizing a second object in the environment;

aligning the virtual model to the second object; and based on the parametric representation of hand motion, determining a sequence of actions for performance, relative to the virtual model as aligned to the second object, by a manipulator of the robotic device, where the sequence of actions is spatially consistent with the parametric representation of hand motion relative to the virtual model as aligned to the first object, wherein the parametric representation includes a multi-dimensional vector, wherein each dimension of the multi-dimensional vector encodes an articulation of at least one of a plurality of hand joints.

19. The method of claim 18, further comprising, for each action of the sequence of actions, generating one or more corresponding commands configured to cause the manipulator to perform the action.

20. The method of claim 19, further comprising updating the one or more commands based on the image data to thereby align the manipulator to the second object.

* * * * *